United States Patent
Maurer et al.

(10) Patent No.: US 9,031,291 B2
(45) Date of Patent: *May 12, 2015

(54) FINGERPRINT PREVIEW QUALITY AND SEGMENTATION

(71) Applicant: Aware, Inc., Bedford, MA (US)

(72) Inventors: James M. Maurer, Bow, NH (US); L. Scott Hills, Stow, MA (US)

(73) Assignee: Aware, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/848,908

(22) Filed: Mar. 22, 2013

(65) Prior Publication Data

US 2013/0259331 A1    Oct. 3, 2013

Related U.S. Application Data

(60) Continuation of application No. 13/047,568, filed on Mar. 14, 2011, now Pat. No. 8,452,060, which is a division of application No. 11/426,114, filed on Jun. 23, 2006, now Pat. No. 7,936,907.

(60) Provisional application No. 60/795,215, filed on Apr. 26, 2006.

(51) Int. Cl.
*G06K 9/00* (2006.01)
*G06K 9/03* (2006.01)

(52) U.S. Cl.
CPC ............ *G06K 9/00067* (2013.01); *G06K 9/036* (2013.01)

(58) Field of Classification Search
USPC ........ 340/5.53, 5.83; 382/112, 124, 125, 205, 382/254, 260
See application file for complete search history.

(56) References Cited

U.S. PATENT DOCUMENTS

| | | | |
|---|---|---|---|
| 5,140,642 | A | 8/1992 | Hsu et al. |
| 5,317,390 | A | 5/1994 | Bolza-Schunemann et al. |
| 5,631,971 | A | 5/1997 | Sparrow |
| 5,659,626 | A | 8/1997 | Ort et al. |
| 5,799,098 | A | 8/1998 | Ort et al. |
| 5,926,555 | A | 7/1999 | Ort et al. |

(Continued)

FOREIGN PATENT DOCUMENTS

| | | |
|---|---|---|
| EP | 0626656 | 11/1994 |
| EP | 1246120 | 10/2002 |

(Continued)

OTHER PUBLICATIONS

Decision of Refusal (including translation) for Japanese Patent Application No. 2009-507656 dated Jun. 3, 2013.

(Continued)

*Primary Examiner* — Gregory M Desire
(74) *Attorney, Agent, or Firm* — Jason H. Vick; Sheridan Ross, PC

(57) ABSTRACT

A ridge flow based fingerprint image quality determination can be achieved independent of image resolution, can be processed in real-time and includes segmentation, such as fingertip segmentation, therefore providing image quality assessment for individual fingertips within a four finger flat, dual thumb, or whole hand image. A fingerprint quality module receives from one or more scan devices ridge-flow—containing imagery which can then be assessed for one or more of quality, handedness, historical information analysis and the assignment of bounding boxes.

23 Claims, 21 Drawing Sheets

(56) References Cited

U.S. PATENT DOCUMENTS

| | | | |
|---|---|---|---|
| 5,933,516 | A | 8/1999 | Tu et al. |
| 5,937,082 | A | 8/1999 | Funada |
| 5,963,656 | A | 10/1999 | Bolle et al. |
| 6,243,492 | B1 | 6/2001 | Kamei |
| 6,298,145 | B1 | 10/2001 | Zhang et al. |
| 6,876,757 | B2 | 4/2005 | Yau et al. |
| 6,901,155 | B2 | 5/2005 | Xia et al. |
| 6,959,874 | B2 | 11/2005 | Bardwell |
| 7,110,581 | B2 | 9/2006 | Xia et al. |
| 7,127,106 | B1 | 10/2006 | Neil et al. |
| 7,203,344 | B2 | 4/2007 | McClurg et al. |
| 7,274,807 | B2 | 9/2007 | Hillhouse et al. |
| 7,349,560 | B2 | 3/2008 | Miyazaki |
| 7,359,532 | B2 | 4/2008 | Acharya et al. |
| 7,489,807 | B2 | 2/2009 | Hwang et al. |
| 7,565,548 | B2 | 7/2009 | Fiske et al. |
| 7,711,158 | B2 | 5/2010 | Ahn et al. |
| 7,936,907 | B2 | 5/2011 | Maurer et al. |
| 8,073,209 | B2 | 12/2011 | McClurg et al. |
| 8,238,621 | B2 | 8/2012 | Maurer et al. |
| 2001/0040988 | A1 | 11/2001 | Takahashi |
| 2002/0012455 | A1 | 1/2002 | Benckert |
| 2002/0018585 | A1 | 2/2002 | Kim |
| 2003/0142856 | A1 | 7/2003 | McClurg et al. |
| 2003/0179422 | A1 | 9/2003 | Liu |
| 2004/0120602 | A1 | 6/2004 | Nakajima et al. |
| 2004/0151352 | A1 | 8/2004 | Nakajima et al. |
| 2004/0230810 | A1 | 11/2004 | Hillhouse |
| 2005/0025344 | A1 | 2/2005 | Zyzdryn |
| 2005/0036664 | A1 | 2/2005 | Davis |
| 2005/0129290 | A1 | 6/2005 | Lo et al. |
| 2005/0157913 | A1 | 7/2005 | Yau et al. |
| 2006/0067566 | A1 | 3/2006 | Hara |
| 2006/0228006 | A1 | 10/2006 | Matsumoto et al. |
| 2008/0013803 | A1 | 1/2008 | Lo et al. |
| 2008/0238613 | A1 | 10/2008 | Salva Calcagno |
| 2010/0046812 | A1 | 2/2010 | Maurer et al. |
| 2010/0054553 | A1 | 3/2010 | Maurer et al. |
| 2011/0164793 | A1 | 7/2011 | Maurer et al. |

FOREIGN PATENT DOCUMENTS

| | | |
|---|---|---|
| EP | 1288844 | 3/2003 |
| EP | 1643414 | 4/2006 |
| EP | 1724725 | 11/2006 |
| JP | A-(Hei5)-229107 | 9/1993 |
| JP | 09-167230 | 6/1997 |
| JP | 11-025260 | 1/1999 |
| JP | 11-025275 | 1/1999 |
| JP | A-(Hei11)-039486 | 2/1999 |
| JP | 2000-057338 | 2/2000 |
| JP | 2000-215309 | 8/2000 |
| JP | 2001-167268 | 6/2001 |
| JP | 2002-511620 | 4/2002 |
| JP | 2002-245464 | 8/2002 |
| JP | 2002-288641 | 10/2002 |
| JP | 2003-256815 | 9/2003 |
| JP | 2003-337949 | 11/2003 |
| JP | 2004-520752 | 7/2004 |
| JP | 2005-516290 | 6/2005 |
| JP | 2005-531077 | 10/2005 |
| JP | 2006-505853 | 2/2006 |
| JP | 2006-72555 | 3/2006 |
| JP | 2006-099326 | 4/2006 |
| JP | 2007-202912 | 8/2007 |
| WO | WO 99/53443 | 10/1999 |
| WO | WO 01/55966 | 8/2001 |
| WO | WO 02/087259 | 10/2002 |
| WO | WO 03/063054 | 7/2003 |
| WO | WO 2004/003846 | 1/2004 |
| WO | WO 2004/043054 | 5/2004 |
| WO | WO 2005/013183 | 2/2005 |
| WO | WO 2005/086091 | 9/2005 |

OTHER PUBLICATIONS

Lim et al., "Fingerprint Image Quality Analysis," Image Processing, 2004, ICIP 2004, 2004 International Conference of Singapore, Oct. 24-27, 2004, Piscataway, NJ, USA, IEEE, pp. 1241-1244, XP010785234, ISBN: 0-7803-8554-3.

Yao et al., "Quantifying Quality: A Case Study in Fingerprints," Proc. IEEE Conference on AudioID, Mar. 2002, XP002400967, Tarrytown, NY, USA, 6 pages.

Yao et al., "Fingerprint Quality Assessment" In: N. Ratha and R. Bolle: "Automatic Fingerprint Recognition Systems", 2004, Springer-Verlag, XP002669757, pp. 55-66.

Invitation to Pay Additional Fees for International (PCT) Patent Application No. PCT/US2006/024531 mailed Oct. 19, 2006.

International Search Report for International (PCT) Patent Application No. PCT/US2006/024531 mailed Dec. 13, 2006.

Written Opinion for International (PCT) Patent Application No. PCT/US2006/024531 mailed Dec. 13, 2006.

International Preliminary Report on Patentability for International (PCT) Patent Application No. PCT/US2006/024531 mailed Nov. 6, 2008.

Official Action (including translation) for Chinese Patent Application No. 200680054332.1, issued Jun. 17, 2010.

Translation of Official Action for Chinese Patent Application No. 200680054332.1, issued Aug. 3, 2011.

Official Action (including translation) for Chinese Patent Application No. 200680054332.1, issued Nov. 30, 2011.

Official Action (including translation) for Chinese Patent Application No. 200680054332.1, issued Jul. 18, 2012.

Notification of Granting the Patent Right (including translation) for Chinese Patent Application No. 200680054332.1, issued Oct. 31, 2012.

Office Action for European Application No. 06773867.4, mailed Mar. 25, 2009.

Communication about intention to grant a European patent for European Application No. 06773867.4, dated Feb. 25, 2010.

Decision to Grant a European Patent Pursuant to Article 97(1) EPC for European Application No. 06773867.4 mailed Jul. 19, 2010.

European Search Report for European Application No. 10006755.2 dated Feb. 24, 2012.

Official Action for Japanese Patent Application No. 2009-507656 dated Dec. 26, 2011.

Official Action for Japanese Patent Application No. 2009-507656 dated Jul. 9, 2012.

Official Action (including translation) for Japanese Patent Application No. 2009-106704, mailed Sep. 6, 2010.

Official Action (including translation) for Japanese Patent Application No. 2009-106704, mailed Feb. 28, 2011.

Notice of Allowance for Japanese Patent Application No. 2011-183933, mailed Dec. 25, 2012.

Translation of Official Action for Israel Patent Application No. 193711, dated Oct. 3, 2011.

Translation of Official Action for Israel Patent Application No. 193711, dated Oct. 11, 2012.

Official Action (Restriction Requirement) for U.S. Appl. No. 11/426,114, mailed Jun. 30, 2009.

Official Action for U.S. Appl. No. 11/426,114, mailed Aug. 19, 2009.

Official Action for U.S. Appl. No. 11/426,114, mailed Mar. 22, 2010.

Official Action for U.S. Appl. No. 11/426,114, mailed May 13, 2010.

Official Action for U.S. Appl. No. 11/426,114, mailed Feb. 4, 2011.

Notice of Allowance for U.S. Appl. No. 11/426,114, mailed Mar. 11, 2011.

Official Action for U.S. Appl. No. 12/567,862, mailed Aug. 3, 2010.

Official Action for U.S. Appl. No. 12/567,871, mailed Jul. 23, 2010.

Official Action for U.S. Appl. No. 13/047,568, mailed Sep. 30, 2011.

Official Action for U.S. Appl. No. 13/047,568, mailed May 29, 2012.

Notice of Allowance for U.S. Appl. No. 13/047,568, mailed Jan. 22, 2013.

Official Action for U.S. Appl. No. 13/047,576, mailed Sep. 29, 2011.

Notice of Allowance for U.S. Appl. No. 13/047,576, mailed Jun. 8, 2012.

Official Action (including translation) for Chinese Patent Application No. 201110404394.3, mailed Dec. 26, 2013.

(56) References Cited

OTHER PUBLICATIONS

Notice Before Allowance (including translation) for Israel Patent Application No. 193711, mailed Dec. 22, 2013.
Official Action (including translation) for Chinese Patent Application No. 201110404394.3, mailed Jul. 23, 2014.
Office Action (Including Translation) for Japanese Patent Application No. 2013-159442, mailed Jun. 9, 2014.
Office Action (Including Translation) for Japanese Patent Application No. 2013-159443, mailed Jul. 28, 2014.

FINGERPRINT PREVIEW QUALITY AND SEGMENTATION

RELATED APPLICATION DATA

This application is a Continuation of U.S. patent application Ser. No. 13/047,568, filed Mar. 14, 2011, now U.S. Pat. No. 8,452,060, which is a Divisional of U.S. patent application Ser. No. 11/426,114, filed Jun. 23, 2006, now U.S. Pat. No. 7,936,907, which claims the benefit of and priority under 35 U.S.C. §119(e) to U.S. Patent Application No. 60/795,215, filed Apr. 26, 2006, entitled "Real Time Fingerprint Quality and Segmentation," each of which are incorporated herein by reference in their entirety.

BACKGROUND

Field of the Invention

This invention relates generally to quality determination and segmentation. More specifically, an exemplary aspect of the invention relates to quality and segmentation determination of biometric image information, such as fingerprint, handprint or footprint image information.

Livescan type devices provide preview modes of operation that serve as an aid to the operator for finger placement and image fidelity. Because of processing power, timing restrictions and bandwidth requirements, these devices and their associated quality metrics are unable to provide output that can be correlated to other more sophisticated measures of quality used by enrollment applications or Automatic Fingerprint Identification Systems (AFIS), and their associated matching engines. The limitations of the hardware also contributes to deficiencies in the ability to dynamically segment the fingertips from the rest of the hand structure and to separate the image background, such as, smudges, particulates, latent prints, and the like from the fingertips.

As a substitute, livescan type devices utilize image contrast based quality metrics and static scanner platen areas for segmentation. Fingerprint quality metrics used within enrollment and AFIS/matching applications are typically not suitable for this preview capability due to their requirements for full resolution scanning of the fingerprint imagery, typically at 500 ppi and 1000 ppi.

SUMMARY

One exemplary aspect of the invention addresses this gap by providing a resolution independent ridge flow detection technique. A ridge flow map is then used to determine fingerprint quality via a combination of ridge flow strength, ridge flow continuity, and localized image contrast. This ridge flow map can also be used as a basis for segmentation.

Another exemplary aspect of the invention is a ridge flow based system and methodology for fingerprint image quality determination that is independent of image resolution, can be processed in real-time, and includes segmentation, such as fingertip segmentation, therefore providing image quality assessment for individual fingertips with a four finger flat, dual thumb, or whole hand image.

For example, one exemplary aspect is targeted at enrollment applications using livescan fingerprint devices that provide low-resolution preview image data, such as image data representing a finger, hand or other biometric information that includes ridge flow.

Aspects of the invention additionally relate to a fingerprint quality module that receives from one or more scan devices ridge-containing imagery which can then be assessed for one or more of quality, handedness, historical information analysis and the assignment of bounding boxes.

Additional exemplary aspects of the invention relate to ridge flow determination.

Further exemplary aspects of the invention relate to segmentation of a fingerprint image.

Additional exemplary aspects of the invention relate to determining a quality of an input image, such as a fingerprint image.

Still further aspects of the invention relate to modifying the ridge flow process based on image resolution.

Still further exemplary aspects of the invention relate to determining and providing feedback based on a received image(s).

Still further aspects of the invention relate to identifying one or more fingertips and, if needed, trimming the tips at an inter-digit crease.

Still further aspects of the invention relate to determining and placing a bounding box around an identified fingertip.

Additional exemplary aspects of the invention relate to determining in real-time fingerprint quality at a live scan type device.

These and other features and advantages of this invention are described in, or will become apparent from, the following detailed description of the embodiments.

BRIEF DESCRIPTION OF THE DRAWINGS

The embodiments of the invention will be described in detail, with reference to the following figures, wherein.

DETAILED DESCRIPTION

The exemplary systems and methods of this invention will be described in relation to image quality and segmentation. However, to avoid unnecessarily obscuring the present invention, the following description omits well-known structures and devices that may be shown in block diagram form, are generally known or otherwise summarized. For purposes of explanation, numerous specific details are set forth in order to provide a thorough understanding of the present invention. It should however be appreciated that the present invention may be practiced in a variety of ways beyond the specific detail set forth herein.

Furthermore, while the exemplary embodiments illustrated herein show the various components of the system collocated, it should be appreciated that the various components of the system can be located at distant portions of a distributed network, such as a LAN and/or the internet, or within a dedicated system. Thus, it should be appreciated that the components of this system can be combined into one or more devices or collocated on a particular node of a distributed network, such as a communications network. It will be appreciated from the following description, and for reasons of computational efficiency, that the components of the system can be arranged at any location within a distributed network without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information.

The term module as used herein can refer to any known or later developed hardware, software, or combination of hardware and software that is capable of performing the functionality associated with that element. Also, while the invention is described in terms of exemplary embodiments, it should be appreciated that individual aspects of the invention can be separately claimed. While the embodiment discussed herein will be directed toward fingerprint quality and segmentation, it should also be appreciated that the systems and methods will work equally well for any type of image that includes any type of periodic or repeating pattern such as ridge flow including, but not limited to images of fingers, hands, feet or any portion thereof.

Figure 1:
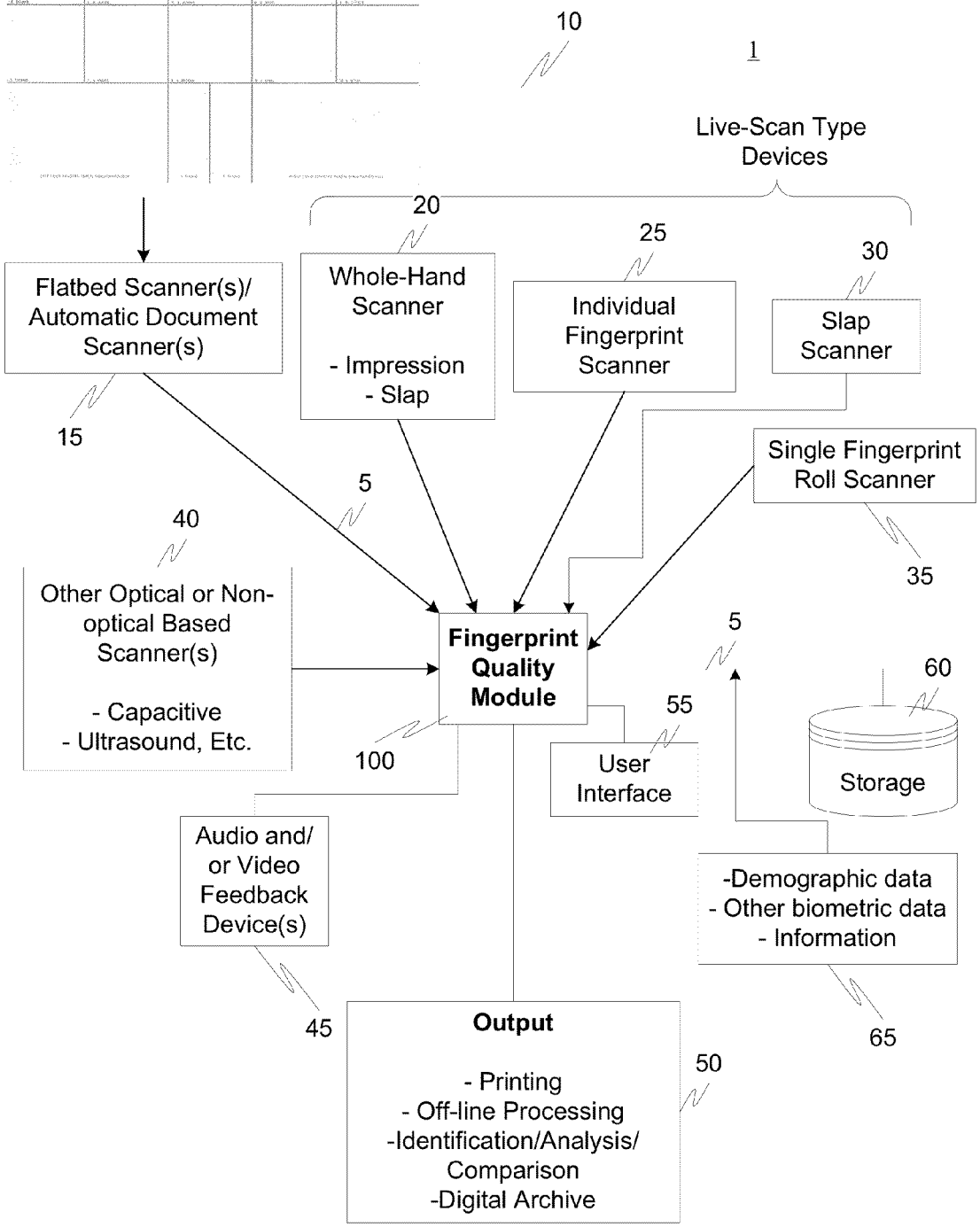
FIG. 1 illustrates an exemplary fingerprint quality system according to this invention.

FIG. 1 illustrates an exemplary embodiment of the fingerprint quality system 1. The fingerprint quality system 1 comprises a fingerprint quality module 100 that can be connected to one or more of a flatbed scanner or automatic document scanner 15, a whole-hand scanner 20, and individual fingerprint scanner 25, a slap scanner 30, a single fingerprint roll scanner 35, other optical or non-optical based scanners 40, audio and video feedback device(s) 45, one or more user interfaces 55, a demographic data supply 65 and storage 60, with the information from the fingerprint quality module 100 capable of being output via output 50.

The fingerprint quality module 100 receives input from various sources. For example, the flatbed scanner or automatic document scanner 15 digitizes information on a fingerprint card 10 with a corresponding image being forwarded to the fingerprint quality module 100 for review. The live-scan type devices such as the whole-hand scanner 20, which can take a slap scan, the individual fingerprint scanner 25, and slap scanner 30 also capture image information corresponding to a scan of a ridge flow containing portion of the anatomy. Similarly, the single fingerprint roll scanner 35 inputs image data corresponding to a roll print to the fingerprint quality module 100.

Additionally, or alternatively, the fingerprint quality module 100 can receive image data from other optical or non-optical based scanners 40 such as capacitive, ultrasound, or in general from any source capable of forwarding an image containing ridge flow information.

In general, any of the input image(s) can be optionally pre-processed to enhance ridge flow detection. For example, the input image(s) can be pre-processed to adjust contrast, sharpness or sampling. The image(s) can also be preprocessed for enhancement or skeletonization.

In operation, the fingerprint quality module 100 receives an image from one of the input devices and determines ridge flow. Once ridge flow has been determined, if it can be determined, regions within the image can be identified, such as a finger, a finger tip, a toe, a hand, palm, or in general any region or regions based, for example, on the particular operating environment of the system 1.

Next, the fingerprint quality module 100 performs one or more of determining and scoring the quality of the image, assigning bounding boxes to the identified regions, determining handedness of the image and performing historical information analysis on a series of captured images. For example, images can be received in real-time at the fingerprint quality module 100. A series of images can be stored with the cooperation of storage 60 such that the fingerprint quality module 100 can perform an analysis over several frames of a scan and thus, for example, establish trending information regarding the quality of the images. This trending information can then be used to assist with providing audio or video feedback to a fingerprintee and/or dynamically utilized with predication of when a "good image" could be captured.

Depending on the results of one or more of the quality determination, assigning the bounding boxes, handedness determination and historical information analysis, the fingerprint quality module 100 can provide feedback via one or more of the audio and/or video feedback device(s) 45 and user interface(s) 55. For example, the audio and/or video device(s) 45 can be used to provide feedback to the fingerprintee to indicate if a scan has been successful, if movement of the finger(s) on the platen is required, to press harder or lighter, to straighten the hand, or the like. The feedback can be in audio and/or video and/or graphically, with audio cues and/or in a multitude of languages as needed based on, for example, the particular operating environment of the system 1.

Furthermore, the fingerprint quality module 100 could provide feedback via user interface 55. For example, user interface 55 can be used by the system operator with the feedback information including, for example, instructions indicating that the platen needs cleaning, there is a problem with one or more of the scanning devices, whether or not a good scan and capture of the fingerprint information was successful, operating status about the system, or in general any information related to the operation or information being processed by the fingerprint quality module 100.

The user interface 55, in cooperation with the demographic data source 65 also allows one or more of demographic data, other biometric data, or in general any information to be associated with one or more images received from the various scan devices. This information can include, but is not limited to, name, passport number, social security number, date and time information associated with the scan, location information of the scan, or in general any information that could, for example, be used to assist in identifying, classifying, categorizing or flagging the image. The image, with the demographic metadata, can then be stored, for example, in storage 60 or output via output 50.

Output 50 allows, for example, the fingerprint quality module to output one or more images with or without the demographic metadata to allow, for example, printing, off-line processing, identification, analysis, comparison, archiving, or in general output for any need.

Figure 2:
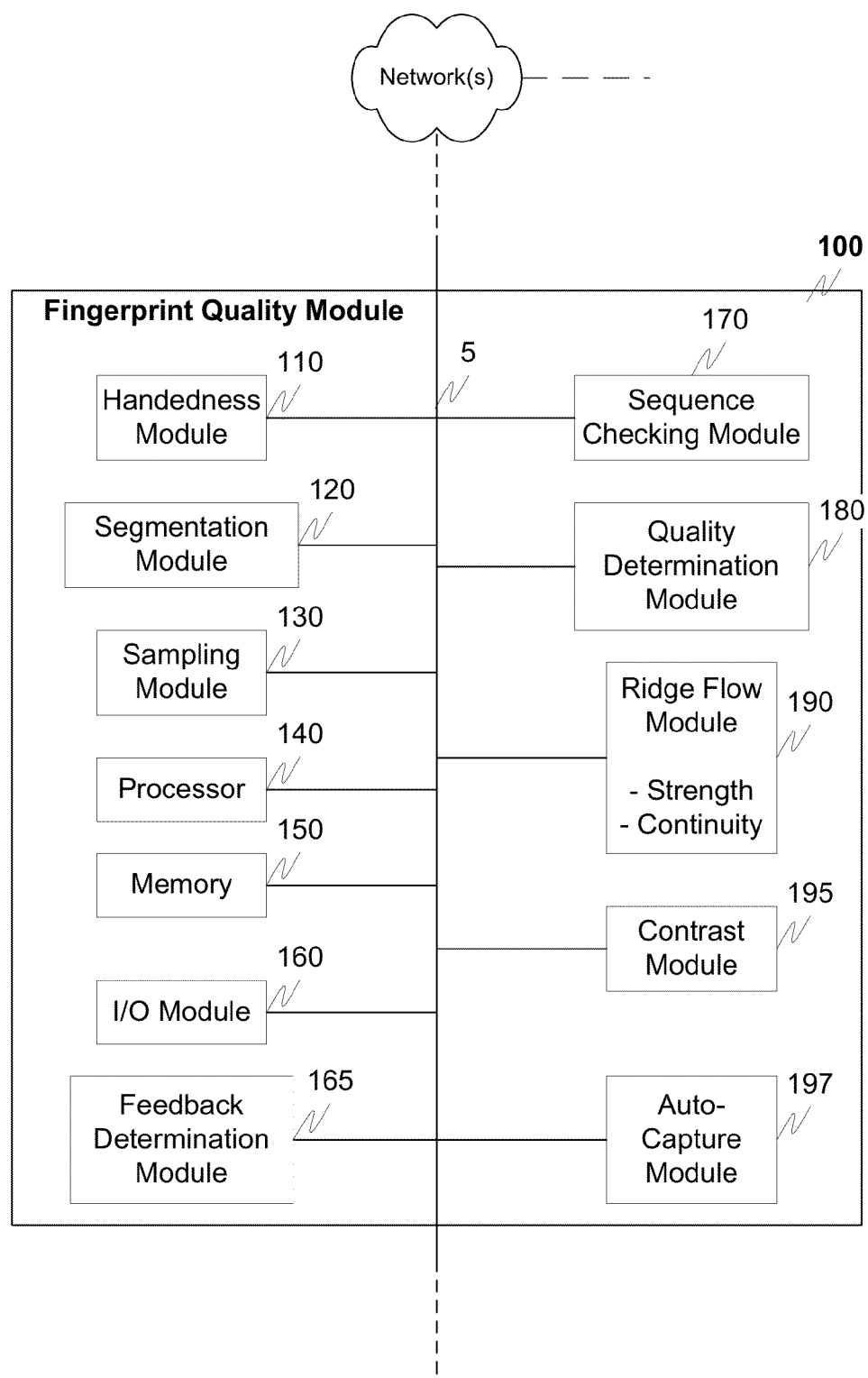
FIG. 2 illustrates in greater detail the fingerprint quality module according to an exemplary embodiment of the invention.

FIG. 2 outlines in greater detail the fingerprint quality module 100. In particular, the fingerprint quality module 100 comprises a handedness module 110, a segmentation module 120, a sampling module 130, a processor 140, memory 150, and I/O module 160, a sequence checking module 170, a quality determination module 180, a ridge flow module 190, a contrast module 195 and an auto-capture module 197, all interconnected by links 5.

As discussed hereinafter in greater detail, an exemplary non-limiting methodology is presented that performs segmentation of fingertips from a multi-finger impression image.

As previously discussed, the process starts with the receipt of a fingerprint image. Upon receipt of the image, and with the cooperation of the ridge flow module 190, the strength, continuity, and angle of ridge flow at, for example, each pixel of the fingerprint image is determined. Alternatively, or in addition, the strength, angle and continuity can be determined for predetermined positions within the image such as across a predetermined grid. While a specific methodology for ridge flow will be discussed hereinafter, it should be appreciated that any methodology can be used to determine ridge flow that is capable of outputting information that represents one or more of the strengths, continuity and angle of ridge flow at various points within the received image.

The segmentation module 120 performs the necessary determinations to identify fingertip locations. There are various methodologies that can be used for segmentation with, in general, the only requirement being accurate identification of the bounding box for finger portions.

The quality determination module 180 utilizes the ridge flow information and segmentation information to determine a quality metric based on a parsing of the fingerprint image area for one or more of contrast, ridge flow strength and local ridge flow. These factors can be combined to form a quality score for each tip. Based on this quality score, and in cooperation with the feedback determination module 165, appropriate feedback, if needed, can be determined and forwarded to an appropriate destination.

The sampling module 130 allows up or down-sampling of received images. For example, depending on the resolution of the received image, it may be advantageous from a computational standpoint to either up or down-sample the image.

The sequence checking module 170 performs a sequence check of the received fingerprint images. A typical sequence check would verify that the images corresponding to individual fingerprint scans are received in a particular order such as, for example, from the index finger to the pinky. If the pinky finger is determined to have been received out of sequence, or if a finger was errantly imaged twice, and in cooperation with the feedback module 165, appropriate feedback can be determined and forwarded to the appropriate destination.

The auto-capture module 197 works in conjunction with the quality determination module 180 and is capable of dynamically determining when an image is expected to meet a certain quality metric. For example, and in conjunction with the historical information analysis, trending information can be analyzed for prediction of when the fingerprint quality system, and in particular the fingerprint quality module 100 is expected to receive a "good" quality scan from one of the scanning devices. For example, if a fingerprintee is initialing pressing too lightly on the platen, and the trending information indicates that there has been a continuous increase in pressure on the platen, there will be an ideal point at which the fingerprint should be captured. This auto-capture module 197 thus tracks this historical information and captures images at a particular point in time during the image capture sequence.

Figure 3:
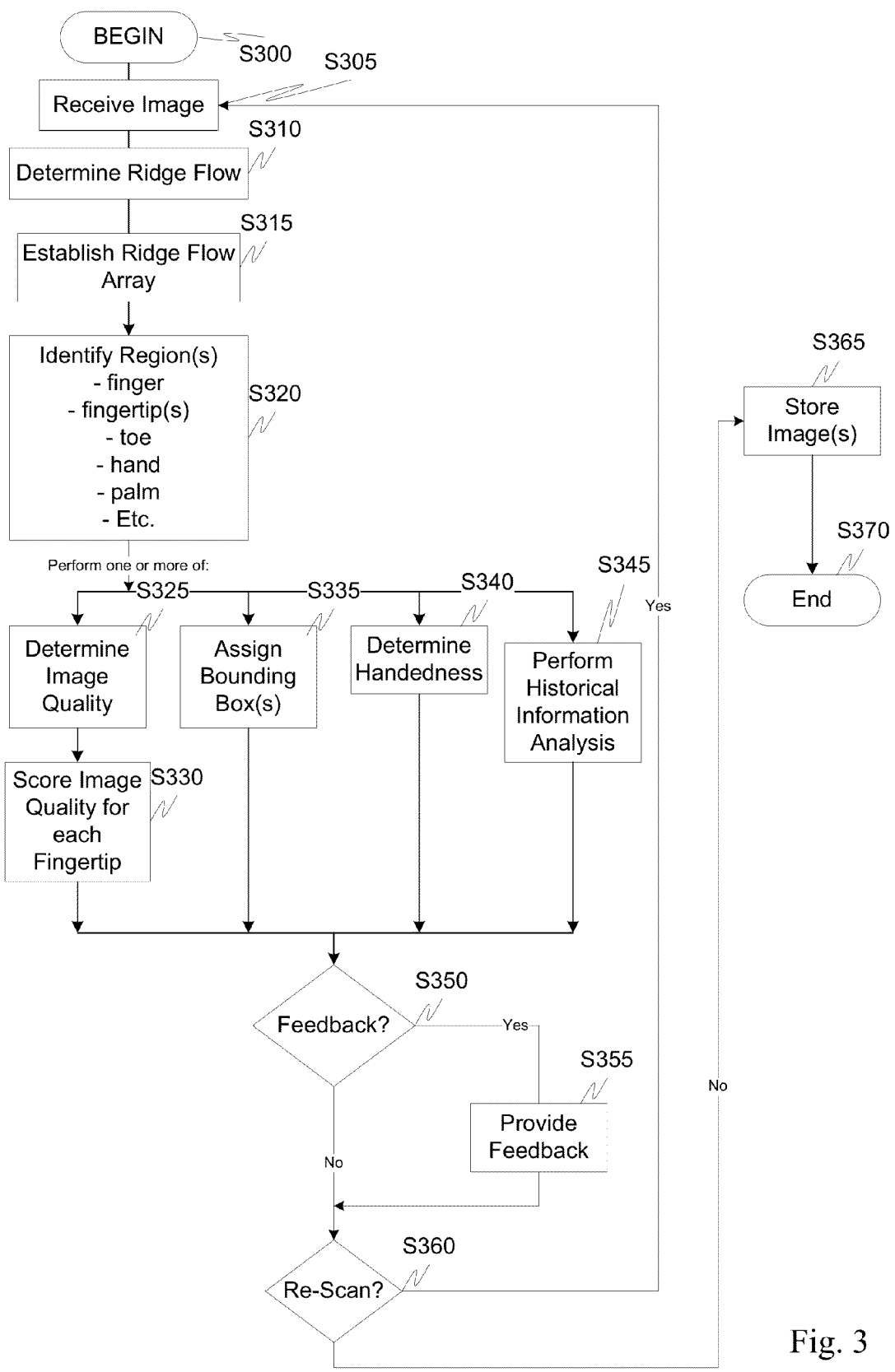
FIG. 3 outlines an exemplary method for determining quality according to this invention.

FIG. 3 is a flowchart that outlines an exemplary method of operating the fingerprint quality system according to this invention. In particular, control begins in step S300 and continues to step S310. In step S305, an image is received. Next, in step S310, ridge flow is determined for the received image. Then, in step S315, a ridge flow array for the received image is established. Control then continues to step S320.

In step S320, one or more regions of the received image are identified. These regions can include, but are not limited to, a finger, a fingertip, toe, hand, palm, or in general any region for which the fingerprint quality system has been assigned to identify. Control then continues to one or more of steps S325, S335, S340 and S345.

More specifically, in step S325, image quality is determined Once the quality of the image has been determined, in step S330, the quality can be scored, for example, for each fingertip. Control then continues to step S350.

In step S335, one or more bounding boxes can be assigned to the identified region(s) with the bounding boxes being placed around the identified regions. More specifically, bounding boxes identify a region of interest about a finger, hand, palm, foot feature, etc., that is of particular interest to the system. Bounding boxes can be determined through use of one or more of ridge flow data, user input, or other data deemed applicable by the system. The exact extents of the box can be the minimum region of the feature of interest or of any further extend as required by the system.

In step S340, a handedness determination is performed. This allows the system to determine whether, for example, a left or right hand, or portion thereof, are represented in the received image. Control then continues to step S350.

In step S345, historical information analysis can be performed. As previously discussed, this historical information analysis allows the system to dynamically track trending information related to a plurality of received images and, for example, trigger a particular action based on one or more trends. Control then continues to step S350.

In step S350, a determination is made, based on any of the preceding steps, whether feedback should be provided to one or more of a system user and a fingerprintee. If a determination is made that feedback is needed, control continues to step S355 where that feedback is provided. Otherwise, control jumps to step S360 where a determination is made whether additional scanning is required. If additional scanning is required, control loops back to step S305. Otherwise, control continues to step S365 where the image(s) is stored. Control then continues to step S370 where the control sequence ends.

The exemplary methodology presented above can be used in a resolution independent manner. Thus, the various methodologies discussed herein can be modified to accept image data at various resolutions with the following detailed discussions of specific ridge flow, segmentation and quality calculations being capable of working with various versions of the same fingerprint image where the difference between the versions is the capture resolution. The processing of each version thus results in similar, if not the same, ridge flow detections. To assist with maintaining the fidelity of the process, both the selected segmentation processes and quality determinations should adhere to resolution invariance. The segmentation and quality methodologies described herein will be presented in a resolution invariant manner to support this fidelity.

It is the resolution independence and the high degree of correlation between the sub-resolution output and the full resolution output, in all aspects of processing-ridge flow segmentation and quality score, as well as the ability to process this information in real-time, that allows rapid feedback to be determined. By determining in a rapid fashion the ridge flow based quality and fingertip locations in a finger, the fingerprint quality system is able to capitalize on image capture devices that often generate low-resolution preview data.

Figure 4:
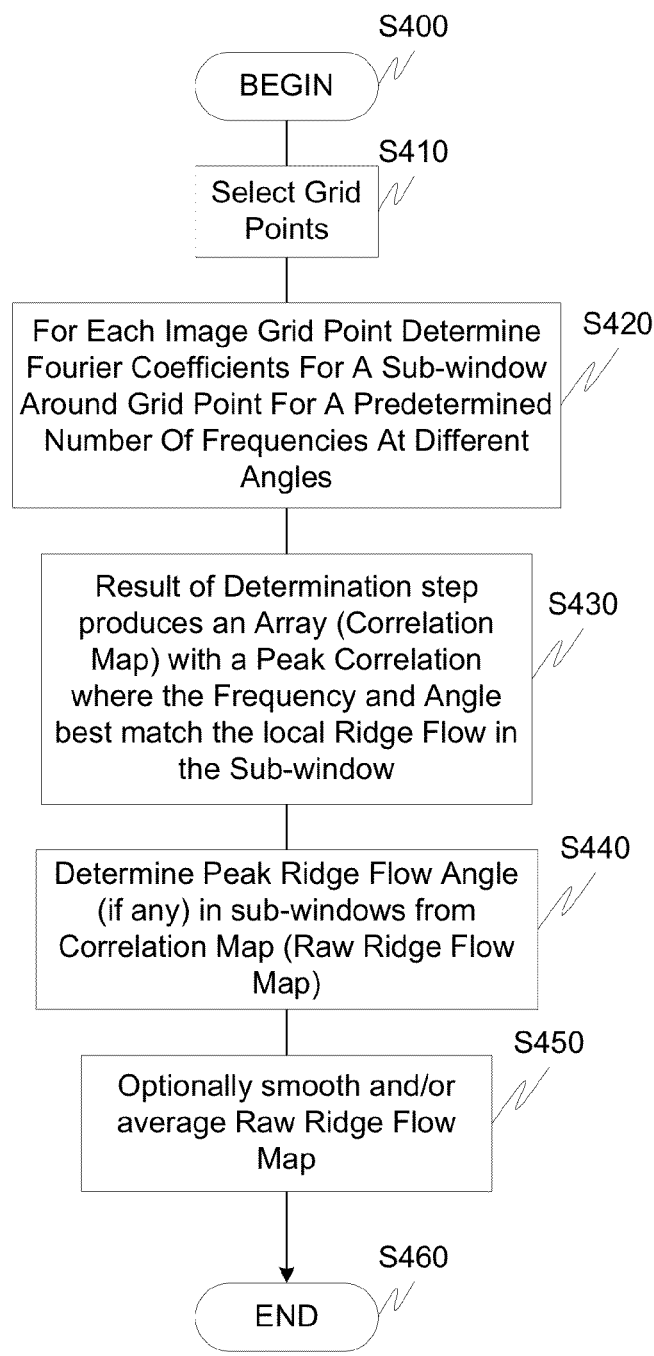
FIG. 4 outlines an exemplary method for performing ridge flow according to this invention.

FIG. 4 outlines in greater detail an exemplary method for determining ridge flow. In particular, control begins S400 and continues to step S410. In step, S410, a grid of points is selected. Next, in step S420, for each image grid point, Fourier coefficients are determined for a sub-window around the grid point for a predetermined number of frequencies at varying angles. Then, in step S430, based on the results of the determination step in 5420, an array of peak correlation values is determined where the frequency and angle best match the local ridge flow in sub-window. Control then continues to step S440.

In step S440, the peak ridge flow angle (if any) in the sub-windows is determined from the correlation map. Next, in step S450, optional smoothing or averaging of the raw ridge flow map can be performed. Control then continues to step S460 where the control sequence ends.

Figure 5:
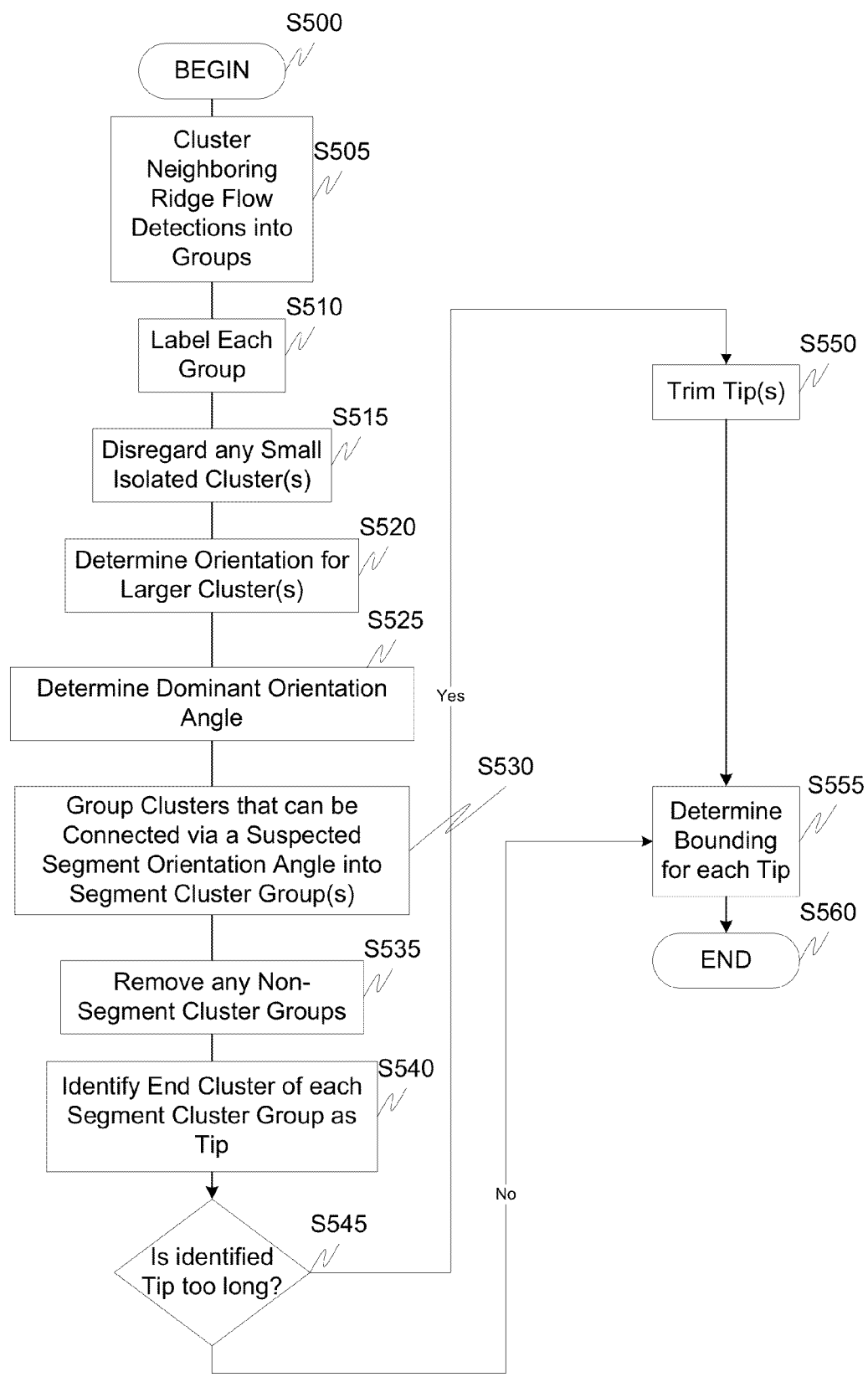
FIG. 5 outlines an exemplary method for performing segmentation according to this invention.

FIG. 5 illustrates an exemplary segmentation methodology. In particular, control begins in step S500 and continues to step S505. In step S505, neighboring ridge flow detections are clustered into groups. Next, in step S510, each group is labeled. Then, in step S515, small isolated cluster(s) are disregarded. Control then continues to step S520.

In step S520, the orientation for the larger cluster(s) is determined. Next, in step S525, the dominant orientation angle is determined. Then, in step S530, clusters are grouped that can be connected via a suspected segment orientation angle into segment cluster group(s). Control then continues to step S535.

In step S535, any non-segment cluster groups are removed. Next, in step S540, the end cluster of each segment cluster group is identified as the tip. Next, in step S545, a determination is made whether the identified tip is too long. If the identified tip is too long, control continues to step S550 where the tip is trimmed with control continuing to step S555. Otherwise, if the identified tip is not too long, control jumps to step S555 where a bounding box is determined for each tip. Control then continues to step S560 where the control sequence ends.

Figure 6:
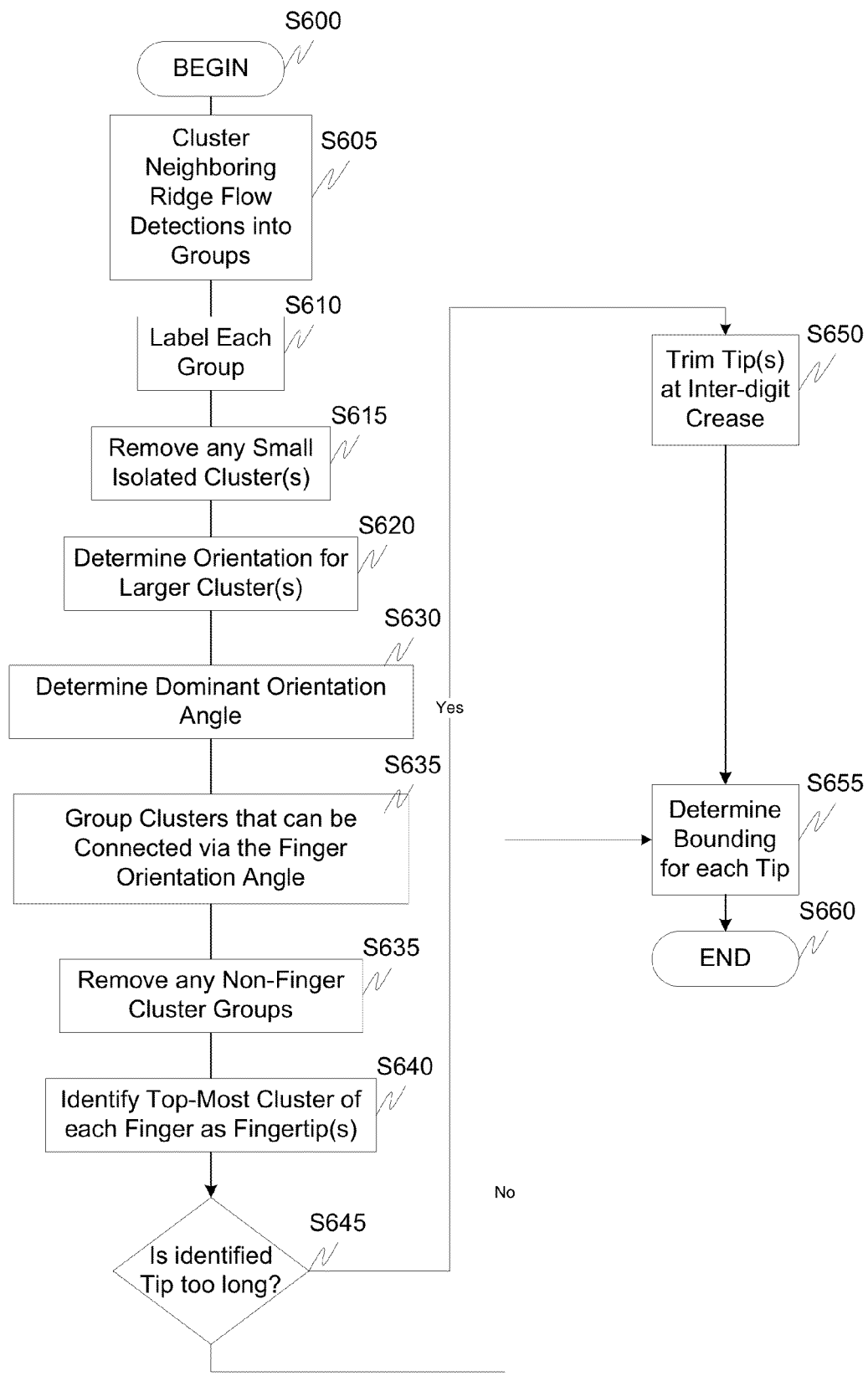
FIG. 6 outlines a more specific exemplary method for performing segmentation according to this invention.

FIG. 6 outlines a finger-specific segmentation methodology according to an exemplary embodiment of this invention. Control begins in step S600 and continues to step S605. In step S605, neighboring ridge flow protections are clustered into groups. Next, in step S610 each group is labeled. Then, in step S615, any small isolated clusters can be removed. Control then continues to step S620.

In step S620, the orientation for the larger cluster(s) is determined. Next, in step S625, the dominant orientation angle is determined. This dominant orientation angle can correspond to, for example, the hand. The orientation for the larger clusters generally corresponds to the clusters representing portions of a finger, such as a knuckle. In step S630, clusters are grouped that can be connected via the finger orientation angle. Next, in step S635, any non-finger cluster groups are removed. Then, the top-most cluster of each finger is identified as the fingertip. Control then continues to step S645.

In step S645, a determination is made whether the identified fingertip is too long. If the tip is too long, control continues to step S650 where the tip is trimmed at the inter-digit crease. Control then continues to step S655.

If the identified tip is not too long, control jumps to step S655 where the bounding box for each tip is determined Control then continues to step S660 where the control sequence ends.

Figure 7:
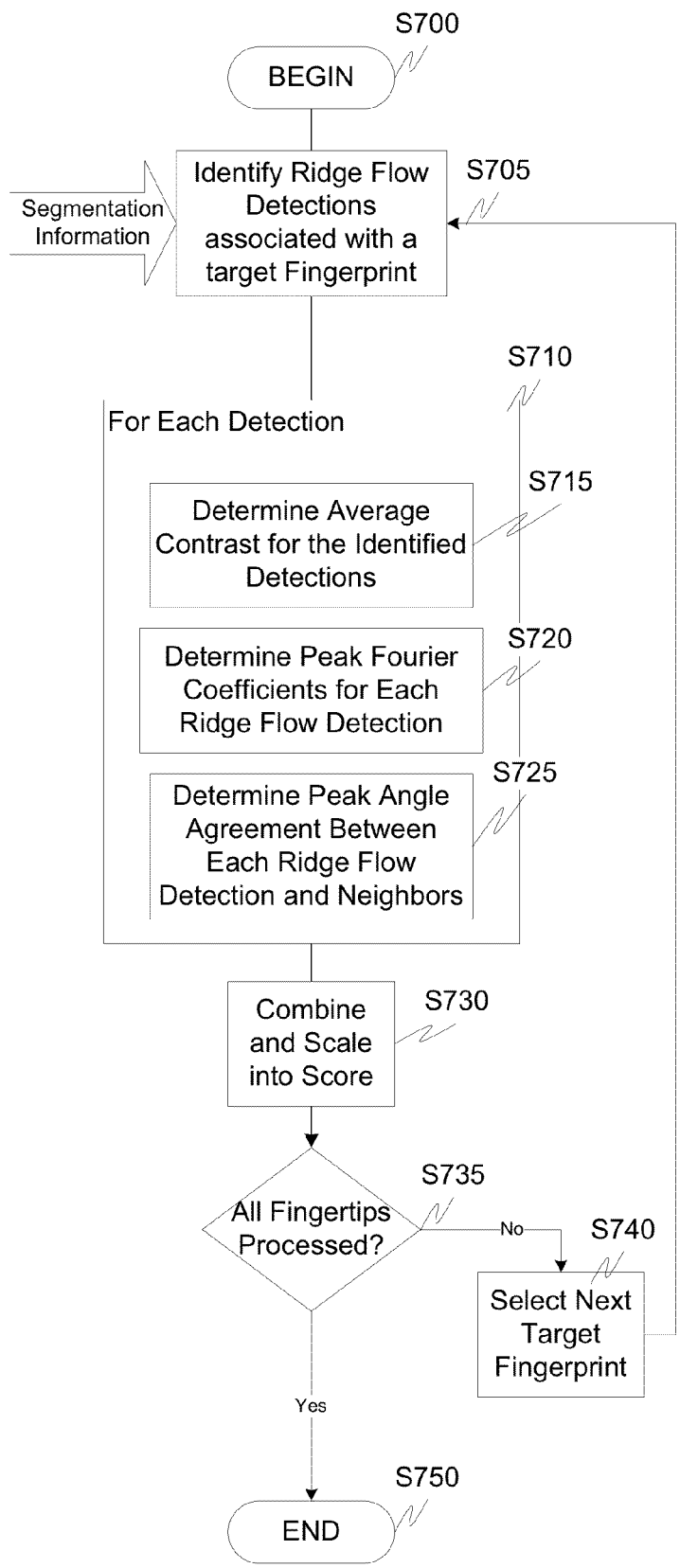
FIG. 7 outlines an exemplary method of determining quality according to this invention.

FIG. 7 outlines an exemplary method for quality determination of the input image, such as a fingerprint. Control begins in step S700 and continues to step S705. In step S705, the ridge flow detections are identified and associated with a target fingerprint based on received segmentation information. Next, in step S710, and for each detection, steps S715-725 are performed.

In step S715, the average contrast for the identified detections is determined. Next, in step S720, the peak Fourier coefficients for each ridge flow detection are determined. Then, in step S725, the peak angle agreement between each ridge flow detection and neighbors is determined Control then continues to step S730.

In step S730, the results are combined and scaled into a quality score. Next, in step S735, a determination is made as to whether all fingertips have been processed. If all fingertips have been processed, control continues to step S750 where the control sequence ends. Otherwise, control jumps to step S740.

In step S740, the next target fingerprint is selected with control returning back to step S705.

In a more specific embodiment, a first step in the determination of quality is identification of all ridge flow detections that belong to the target fingertip. This information comes directly from the segmentation process. For each fingertip, all identified blocks are processed for image contrast, strength of detection, and angle agreement. The image contrast can be derived from the DC component of the Fourier analysis. The difference between the value of the current block and the image background can be the basis for this metric. The greater the difference, the greater the contrast, and the higher the quality score.

The second metric is the relative strength of the peak detection. The value of the Fourier coefficient can be compared against an ideal value. The stronger the coefficient, the more pronounced the ridge flow and the higher the quality score.

The final determination is the local agreement of peak detected angles. For each block, the detected angles are compared to the neighboring peak angles. If the majority of the angles match, then the resulting quality score is high.

These three metrics for gauging quality can then be combined for all fingertip ridge flow blocks and scaled to a meaningful value. One such scoring methodology results in a score from 0 to 100 where, for example, 100 represents the best possible image.

Figure 8:
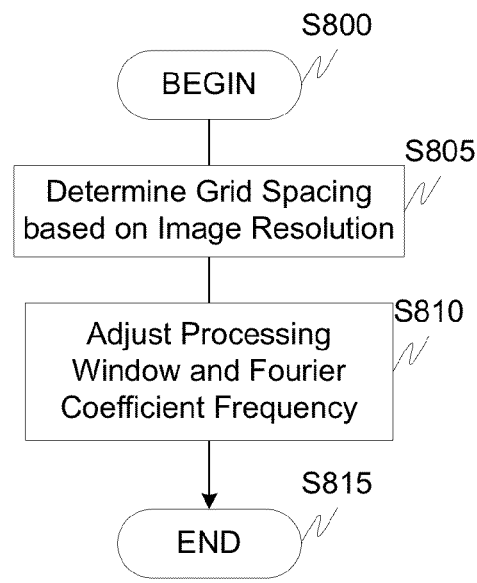
FIG. 8 outlines an exemplary method of modifying ridge flow based on resolution according to this invention.
Figure 9:
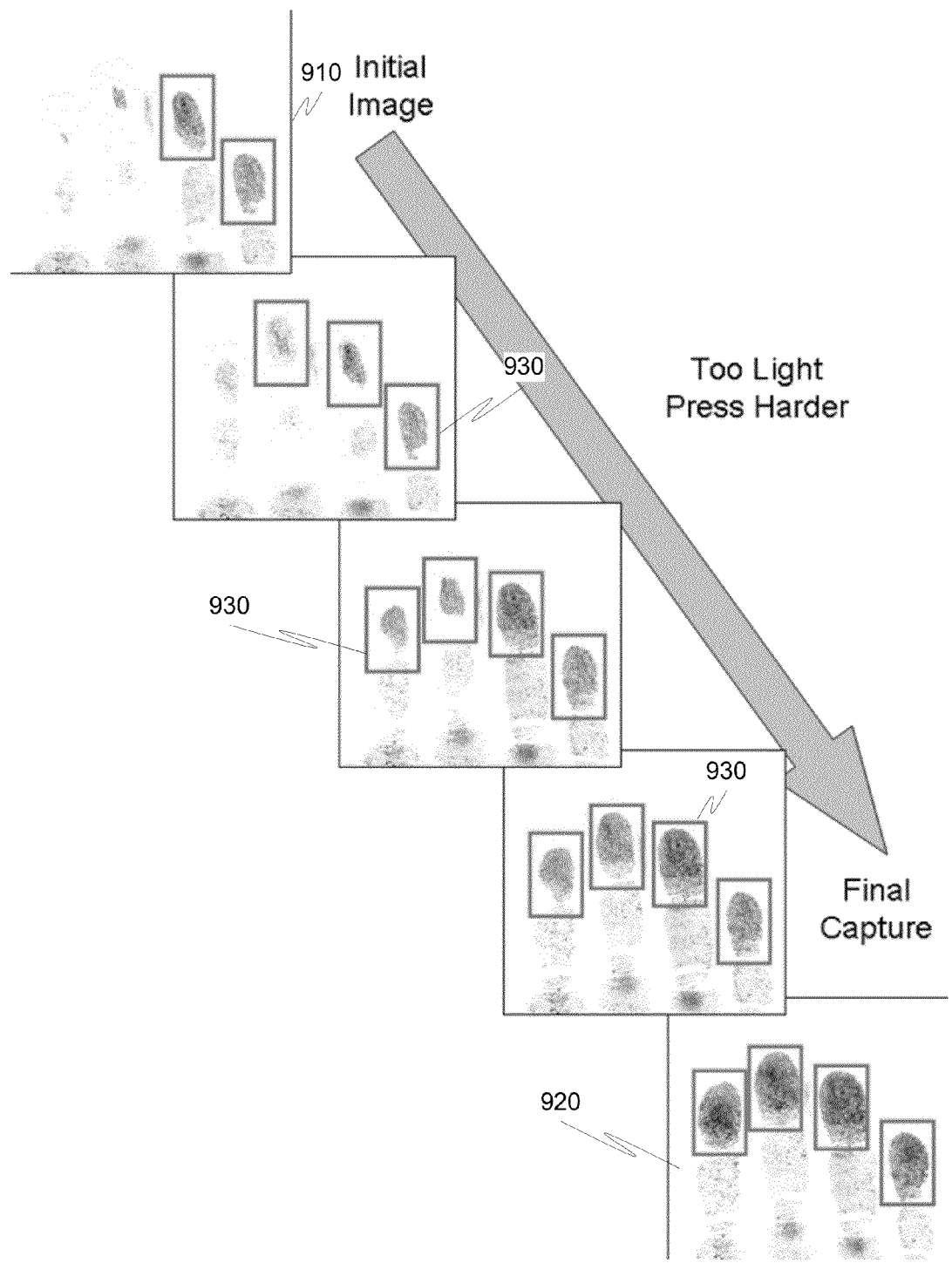
FIGS. 9-16 illustrate slap-scan images of differing quality and exemplary feedback instructions associated therewith.

FIG. 8 illustrates an exemplary method for resolution invariant ridge flow determination. Control begins in step S800 and continues to step S805. In step S805, grid spacing is determined based on the resolution of the input image. Next, in step S810, the processing window and Fourier coefficient frequency is adjusted. Control then continues to step S815 where the control sequence ends.

FIGS. 9-16 represent various preview image sequences showing, in the top-left most corner, the initial image and, as a result of feedback, the final capture shown in the bottom right image. More specifically, in FIG. 9, the initial image 910 is identified as being too light. At this point, a fingerprintee could be given direction to press harder on the platen and as the fingerprintee presses harder, a good capture is achieved in capture 920. As can be also seen in the Figure are the preliminary determinations of bounding boxes 930.

Figure 10:
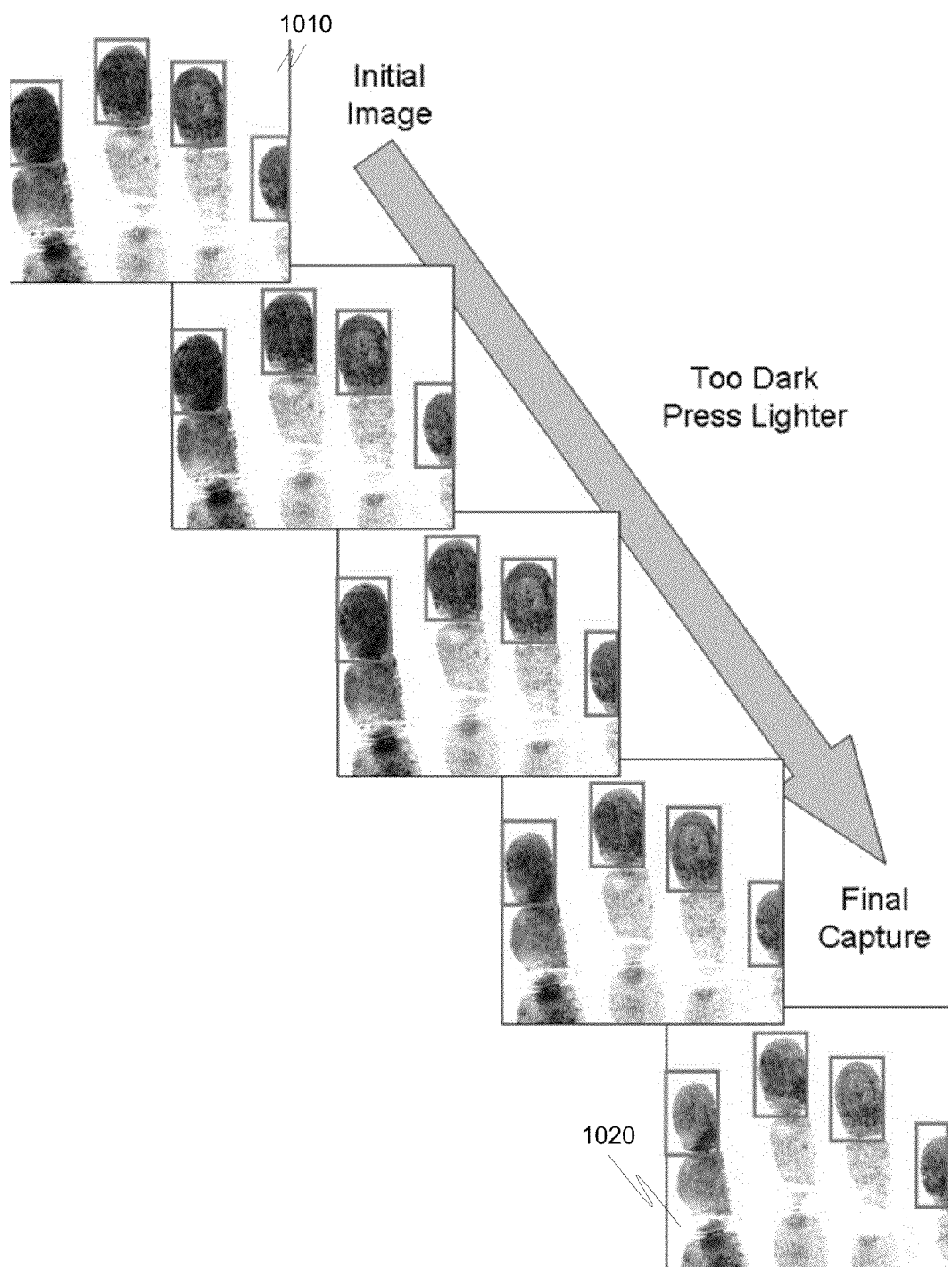

In FIG. 10, the initial image 1010 is too dark. The user is thus provided feedback to, for example, press less hard on the scanner with the final good capture being represented in image 1020.

Figure 11:
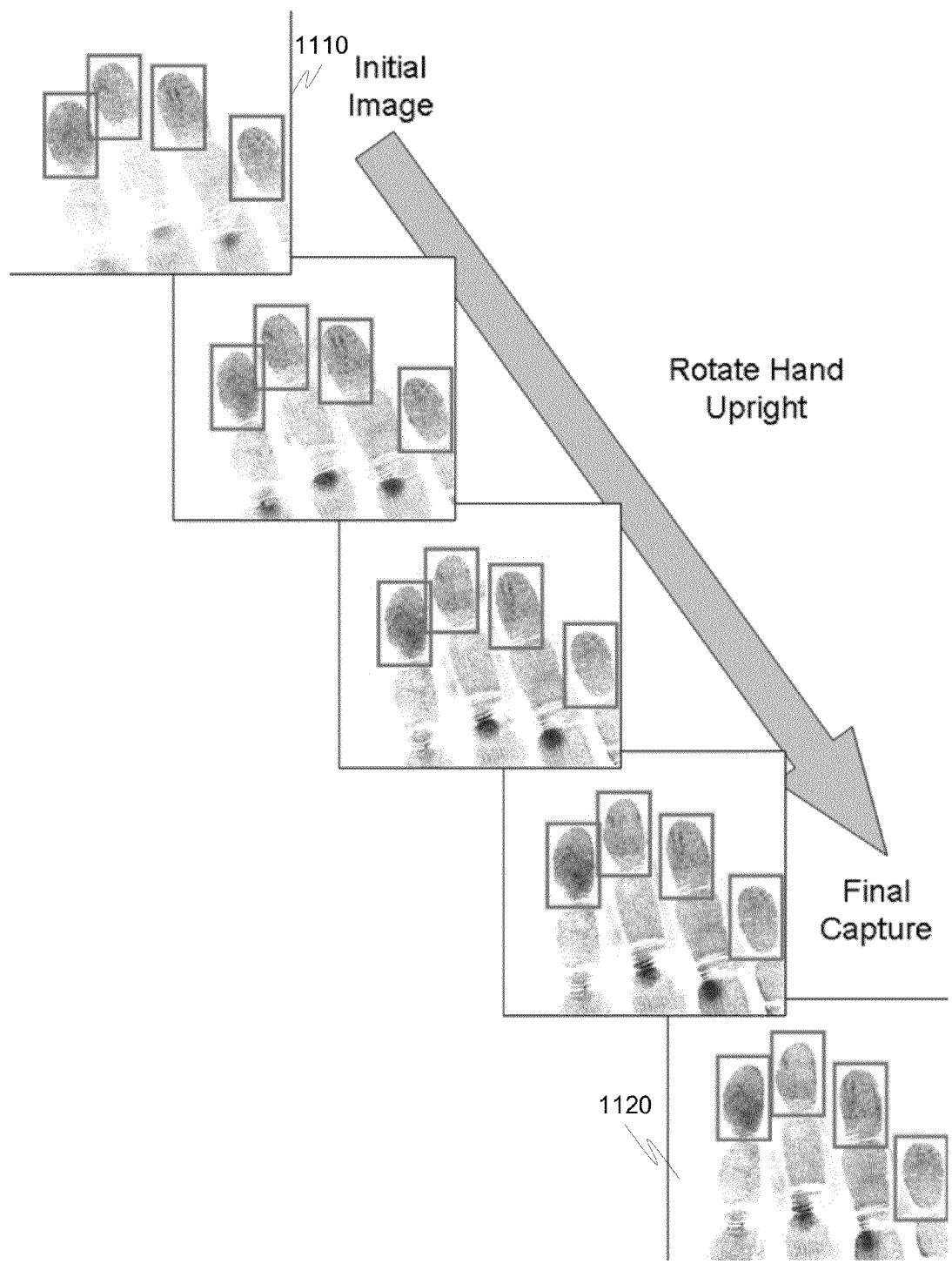

In FIG. 11, the initial image 1110 shows that the right hand is rotated in a counter-clockwise orientation. Upon this detection, the fingerprint quality system can provide feedback to the fingerprintee requesting the fingerprintee to straighten their hand or orient it in a more vertical direction. This dynamic process of capture and feedback continues until, for example, a good capture 1120 is achieved.

Figure 12:
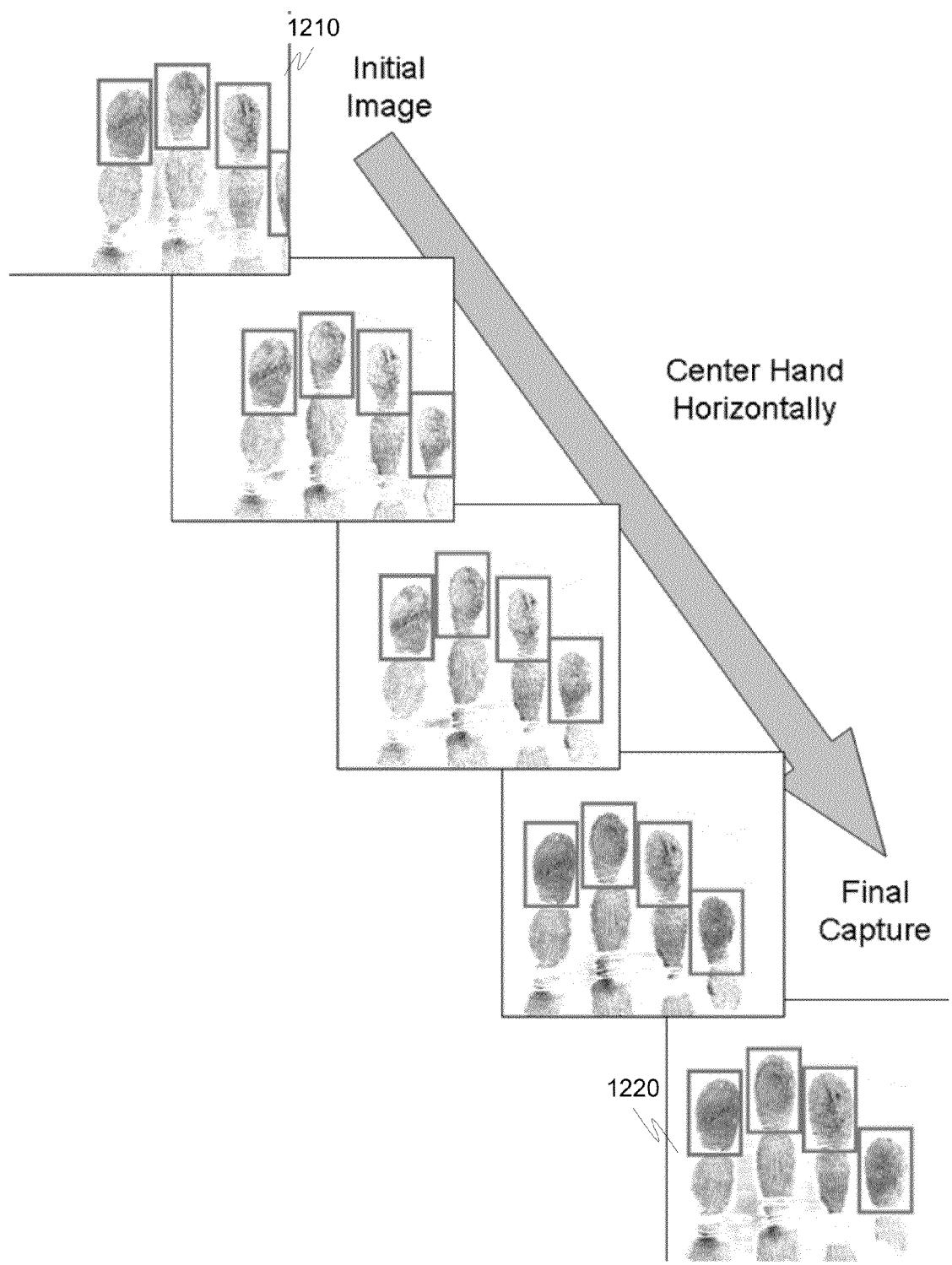

FIG. 12 illustrates an initial image 1210 that has been identified as being partially off to the right-hand side of the scanner. Again, by dynamically monitoring the position of the hand, feedback can be provided to the fingerprintee with the hand becoming more centrally located up until the point of a good capture 1220.

Figure 13:
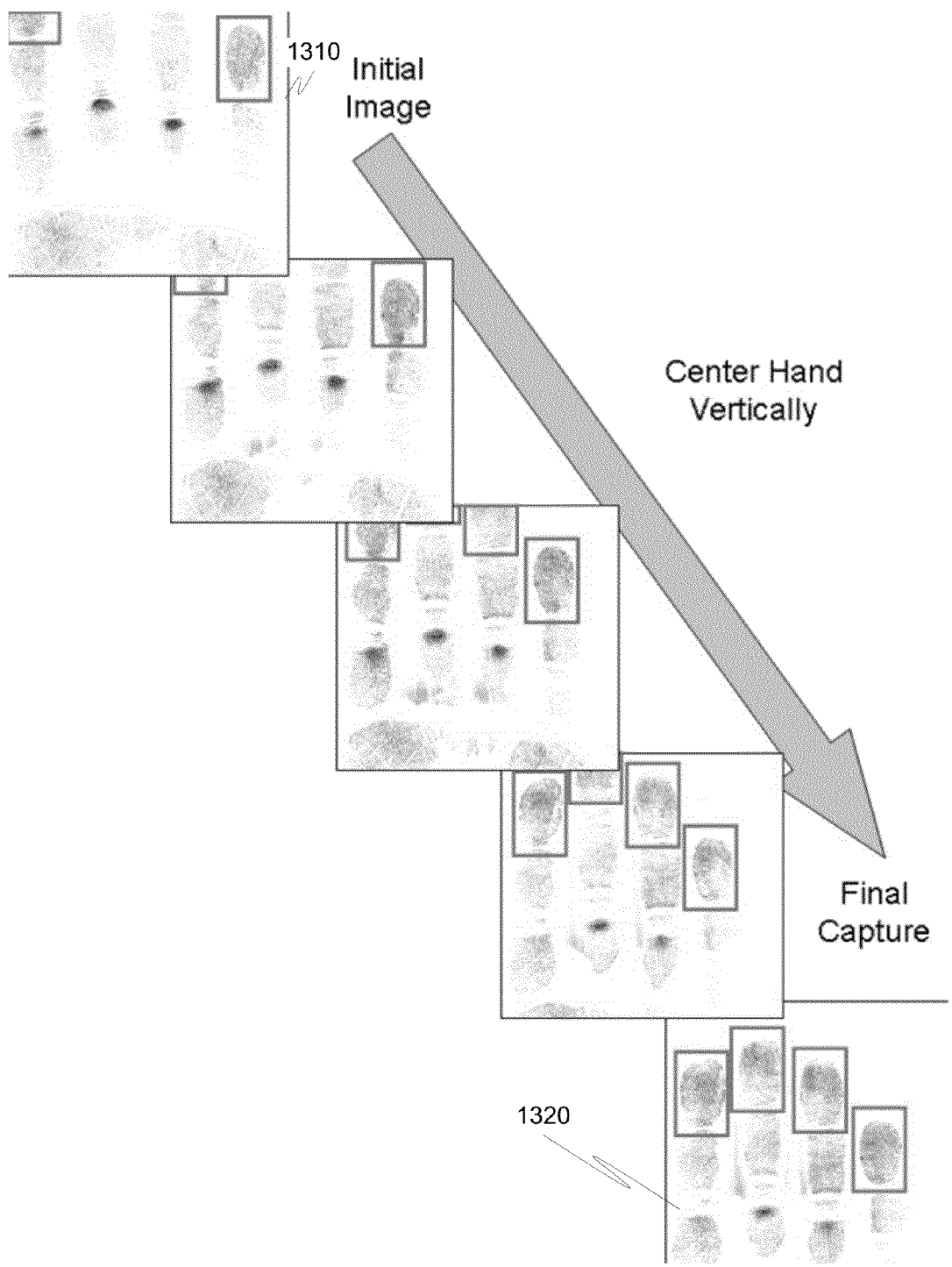

FIG. 13 illustrates an initial image 1310 which shows a hand that needs to be centered in the vertical orientation. Providing feedback to the fingerprintee results in the hand being moved towards the center of the scanning device with a final capture 1320 showing the hand more centrally located on the scanner.

Figure 14:
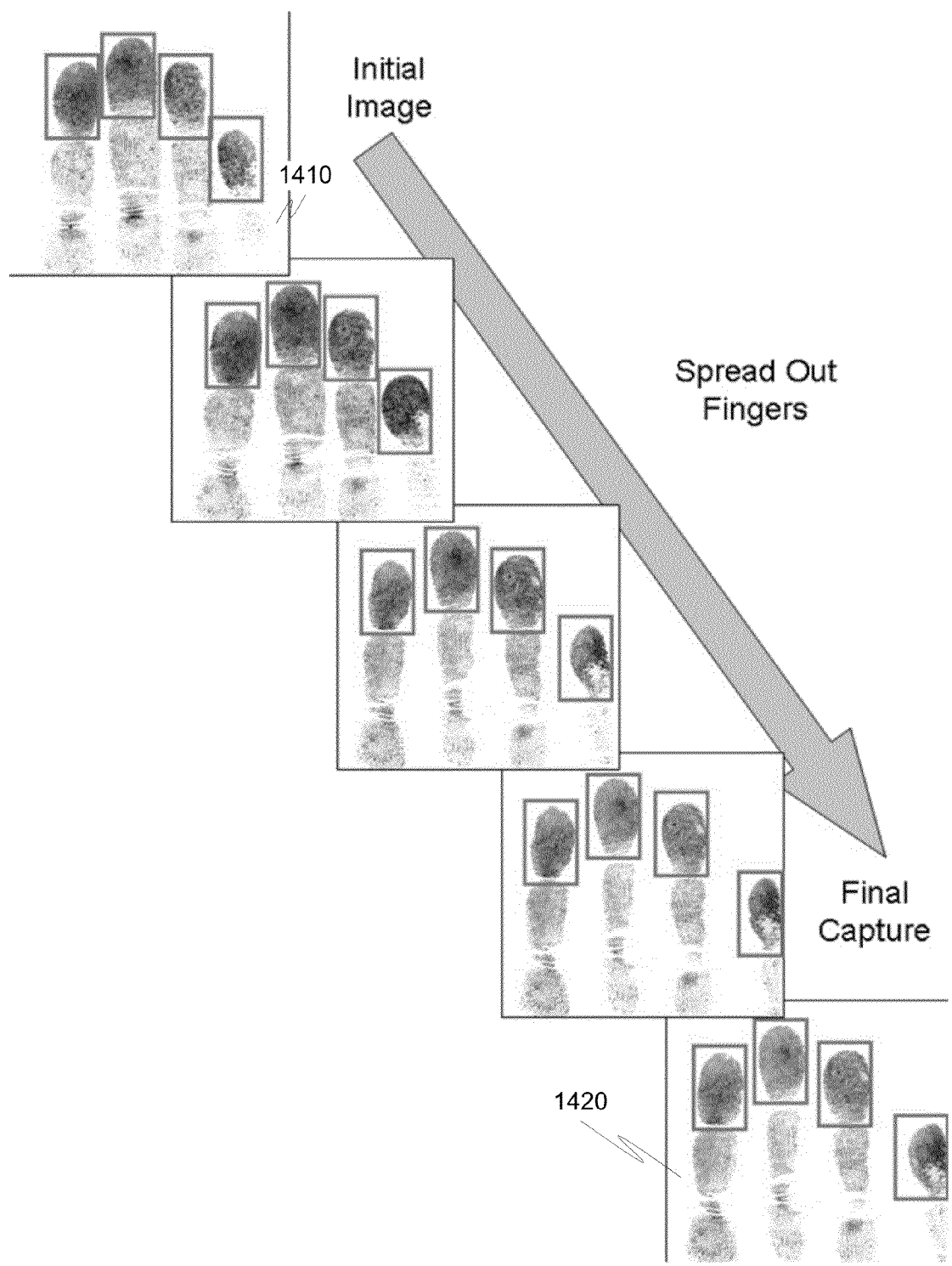

FIG. 14 illustrates an initial image 1410 where, due to the fingers being too closely positioned together, the bounding boxes are partially overlapping. Through the use of feedback, the fingers become more spread out of the series of captures until a good capture is illustrated in capture 1420.

Figure 15:
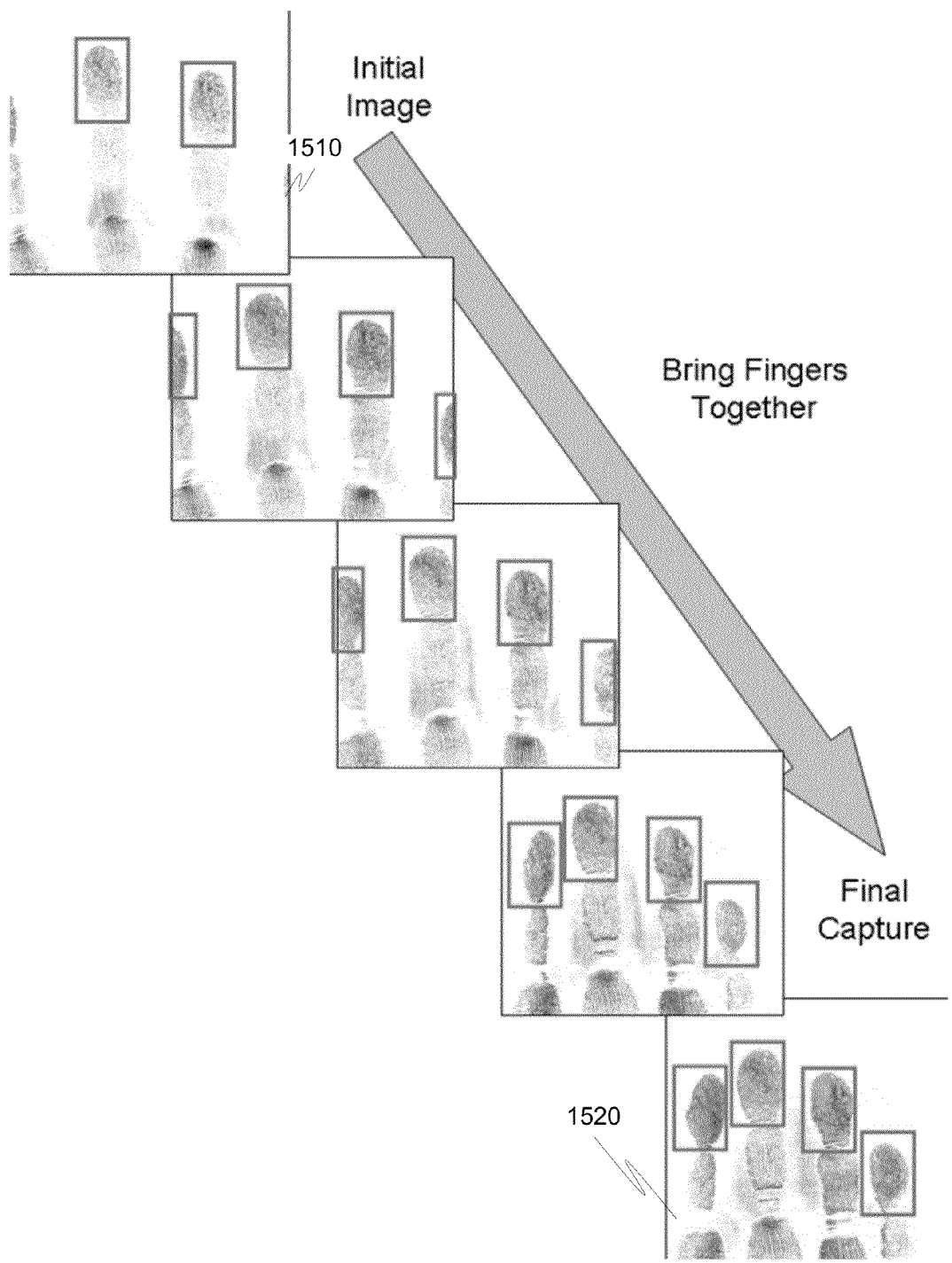

FIG. 15 illustrates an initial image 1510 where the fingers are placed too far apart and are actually outside of the scanning area. Again, for example, with the use of feedback, the fingerprintee can be instructed to bring the fingers more closely together with a good final capture being illustrated in FIG. 1520.

Figure 16:
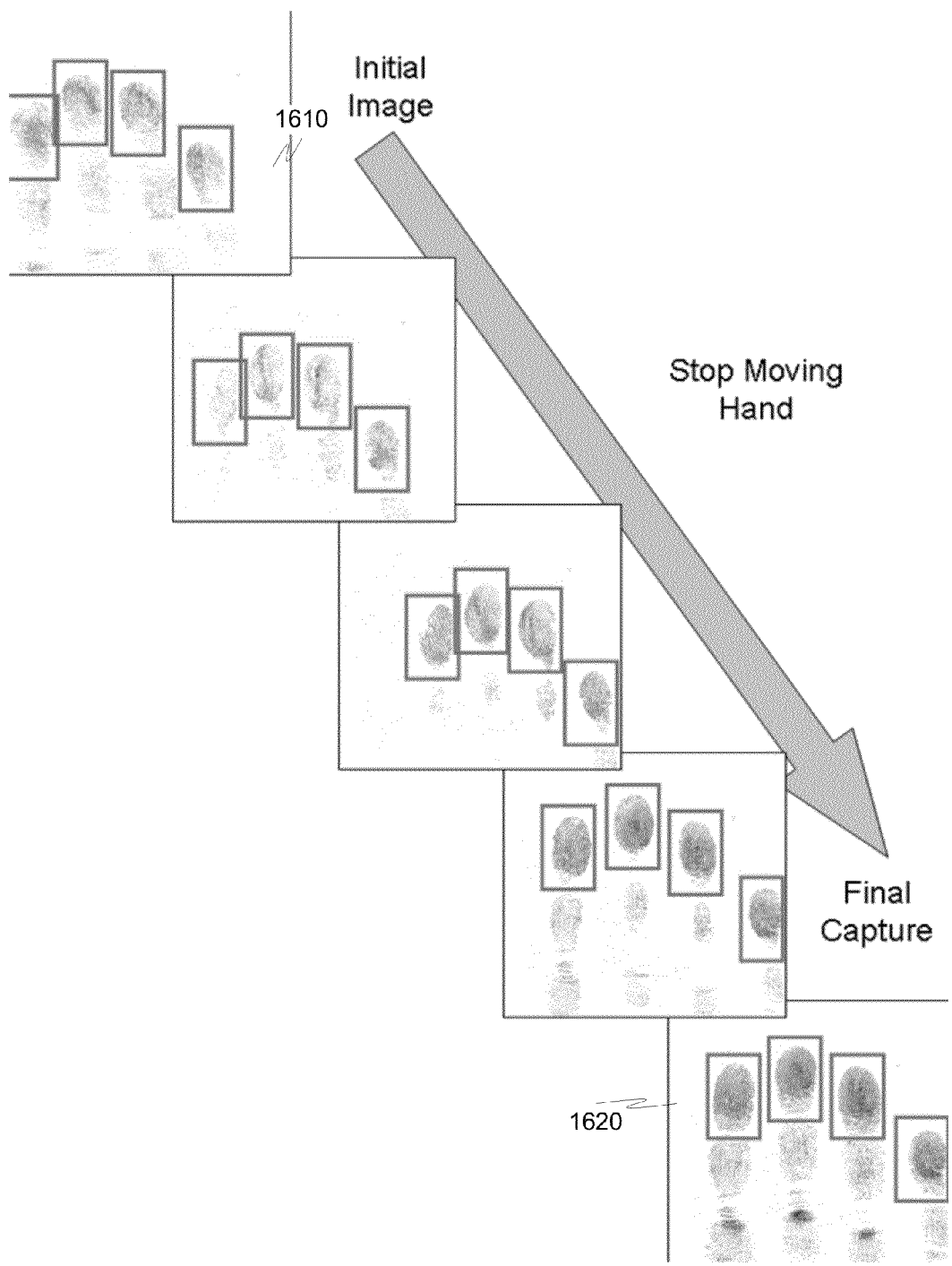

FIG. 16 illustrates an initial image 1610 where the capture is of insufficient quality due to hand movement. As the user's hand becomes more stable a final good capture can be seen in capture 1620.

Figure 17:
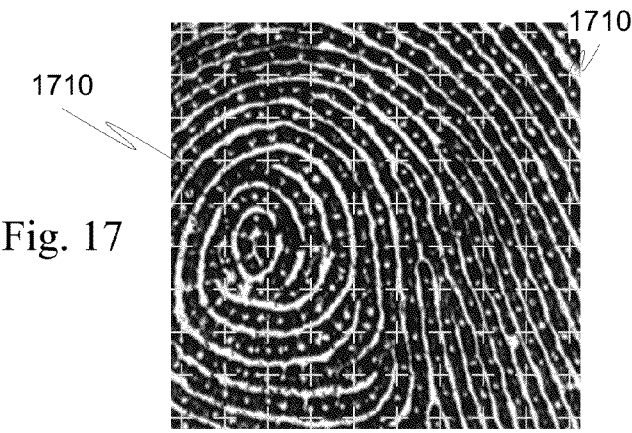
FIG. 17 illustrates an exemplary ridge flow detection grid according to this invention.
Figure 18:
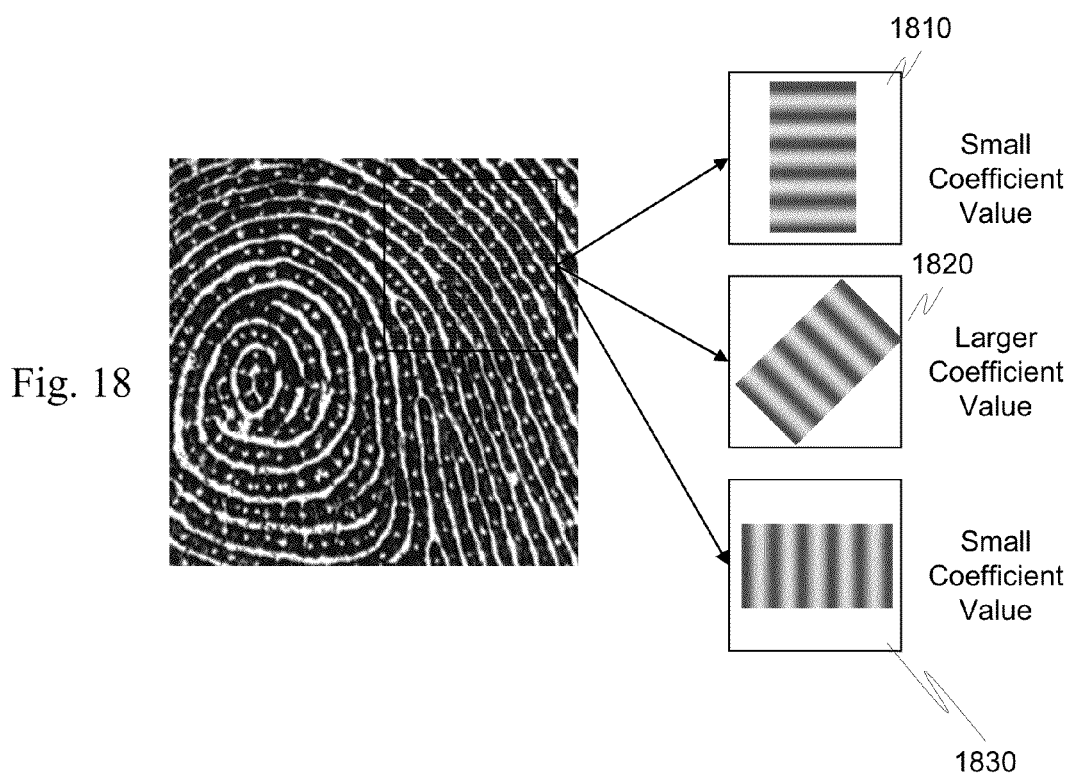
FIG. 18 illustrates exemplary coefficient correlations according to this invention.

By way of illustration with reference to a real-world fingerprint, and with reference to FIG. 17, an exemplary ridge flow determination is shown in relation to a sample fingerprint. It should be appreciated however that other numbers of sinusoids at a different number of angles could be used as well. The determination commences with the establishment of a grid 1710 over the image, for example, at every twelfth column in every twelfth row. The grid represents the centerpoint for the analysis of the local trend for ridge flow. For each grid point 1710 and the image, a small sub-window of the image can be analyzed for ridge flow. At each sample location, a small rectangular window of image data is compared to, for example, five sinusoids of specific frequencies rotated about, for example, sixteen different angles. The Fourier coefficients are calculated for each of these five frequencies at sixteen different angles. The result for each series of comparisons is an array of eighty coefficients with a peak achieved at a frequency and angle that best matches the local ridge flow. This can be seen in FIG. 18 where the sinusoids in portion 1810 have a small coefficient value when compared to the sample location, the sinusoids in portion 1820 have a larger coefficient value than that in portion 1810 with the portion 1830 having a small coefficient value as compared to the sample location.

Figure 19:
FIG. 19 illustrates en exemplary average ridge flow according to this invention.

Once the correlation values have been determined for all windows in the fingerprint image, the resulting correlation map can be processed to identify the peak ridge flow angle (if any) found at every window within the image, thus producing the raw ridge flow map. This data can be further analyzed to remove any singularities and smoothed or averaged to generate an average ridge flow map as illustrated in FIG. 19 with the average ridge flow highlighted by the various arrows 1910. As seen in FIG. 19, the arrows graphically represent the local peak angle for the ridge flow with each arrow representing the peak angle identified out of the eighty coefficients for that grid location.

Figure 20:
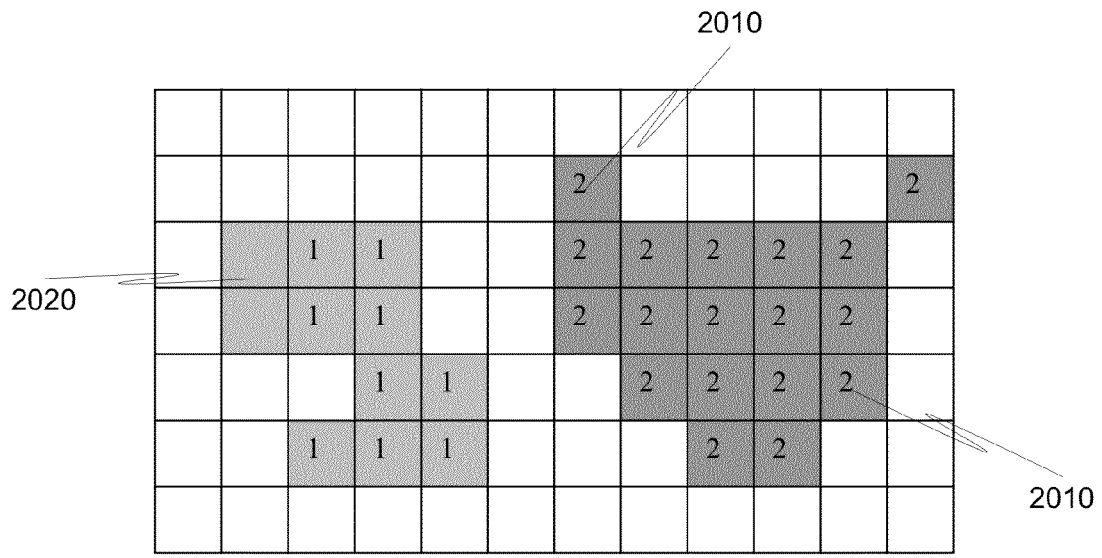
FIG. 20 illustrates an exemplary grouping of clusters according to this invention.
Figure 21:
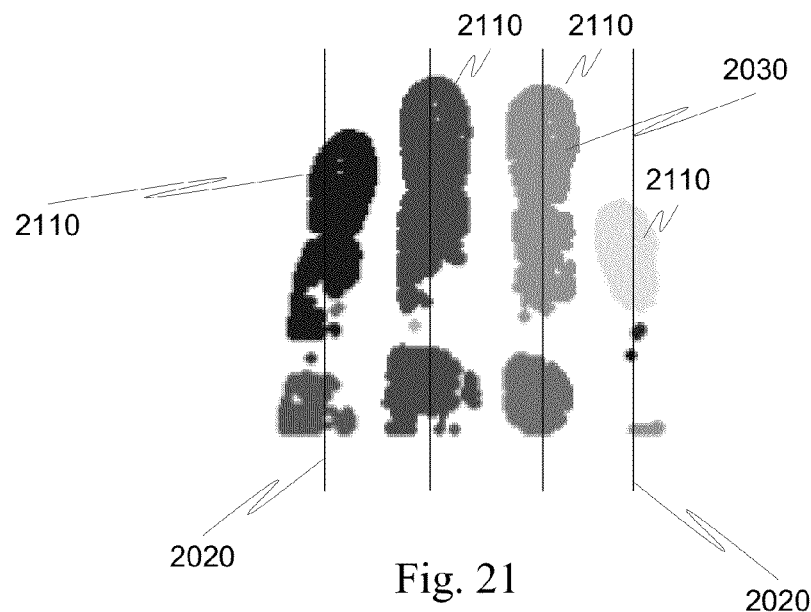
FIG. 21 illustrates an exemplary segmented fingerprint according to this invention.
Figure 22:
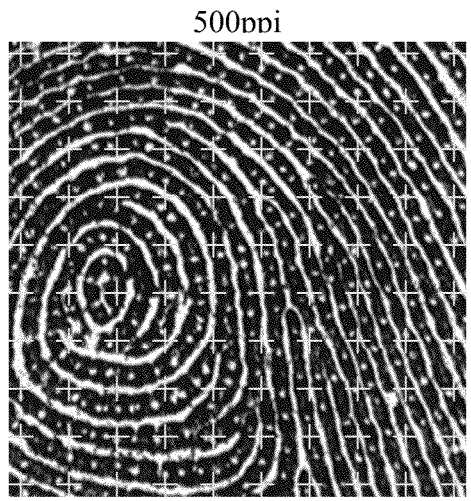
FIG. 22 illustrates an exemplary grid placement according to this invention.
Figure 23:
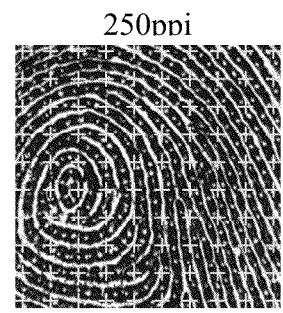
FIG. 23 illustrates a second exemplary grid placement according to this invention.
Figure 24:
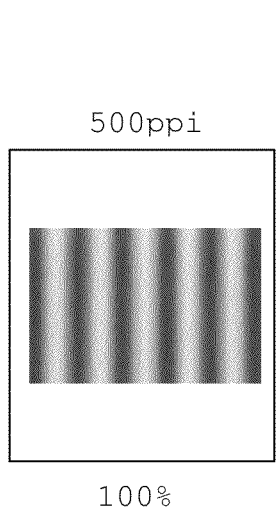
FIGS. 24-27 illustrate exemplary target sinusoids at different resolutions according to this invention.

For example, and with reference to FIGS. 20 and 21, segmentation of fingertips from a multi-finger impression can be carried out based on the following exemplary sequence of steps:

cluster all neighboring ridge flow detections,
eliminate small clusters,
identify the angle of orientation for each cluster,
identify the median angle of orientation for all clusters (the angle of orientation of the hand),
identify all clusters that fall along this angle and group them into a finger,
select the highest cluster for each finger as the fingertip, and
post-process the fingertip to identify the exact fingertip length.

In more detail, and with reference to FIG. 20, ridge flow detections 2010 are grouped with neighboring detections having a similar orientation angle as represented by "2." As seen in FIG. 20, there are two clusters of ridge flow detections that have been identified as "1" and "2" and labeled as such.

Small isolated clusters, such as 2020, are removed or are ignored and the larger clusters processed to determine the orientation of the cluster. The median angle from all clusters is then selected as the overall orientation angle for the hand. The clusters are then again processed to identify the groups that fall along the orientation angle with those clusters that fall on the hand orientation angle being grouped into fingers 2110 as seen in FIG. 21. The clustered ridge flow detections, where each color represents a separate cluster, and the finger groups are then identified as clusters that lie along the hand orientation angle line 2020. Once the finger/cluster associations are made, each group can be processed to identify the topmost cluster as the fingertip, for example, 2030. In the event the length of the fingertip violates the natural length of a fingertip, the cluster is trimmed at the inter-digit crease.

One exemplary advantage of trimming the fingertip, finger, palm, or other target finger is to isolate only the image area directly associated with the target feature. For example, fingertips may be trimmed to length at the inter-digital crease. One exemplar method may use anthropomorphic rules to associate the finger width to the fingertip length. A second exemplar method may parse the ridge flow map to identify the breakdown in ridge flow commonly associated with the inter-digital crease.

Ultimately, the result is the identification of all ridge flow detections that make up the fingertip as well as the bounding box of the fingertip cluster. As with the other aspects of this invention, this can be implemented independent of input image resolution since the determination of ridge flow isolates the above determinations from resolution.

A non-limiting example is illustrated with reference to FIGS. 22-27. Particularly, the establishment of the grid overlaid on the image can be directly related to the input image resolution of the fingerprint image. As the resolution decreases, the space in the grid can be reduced in, for example, a linear manner. If the spacing at 500 ppi is 12×12 pixels, the spacing at 250 ppi could be by 6×6 pixels. For example, in comparing FIGS. 22 and 23, while the spacing in the pixels changes, the placement of the grid points stays the same, such that the grid points are always on the same physical point as the resolution changes. As the resolution is reduced from 500 ppi, both the processing window and the frequency of the Fourier coefficients are reduced linearly with respect to the target resolution. For example, if the full resolution window is 23×13 pixels, and supports a sinusoid that cycles 3 times in the 23 pixel length, the half resolution window would be 11×6 pixels with 3 cycles in that 11 pixels.

Figure 25:
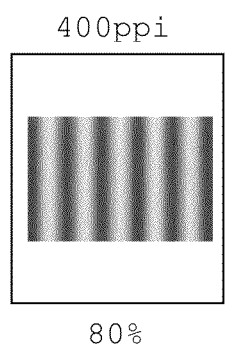
Figure 26:
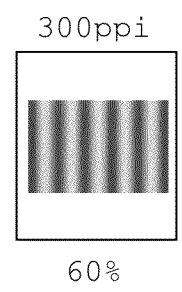
Figure 27:
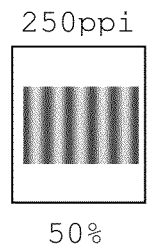

As seen in FIGS. 24-27, FIG. 24 is a representation of the target sinusoid for the original 500 ppi 100% resolution. FIG. 25 represents the target sinusoids at 80% resolution, FIG. 26 at 60% resolution and FIG. 27 at 50% resolution which is 250 ppi.

The following section describes the interim testing products developed as a part of the design and implementation process of the invention.

Figure 28:
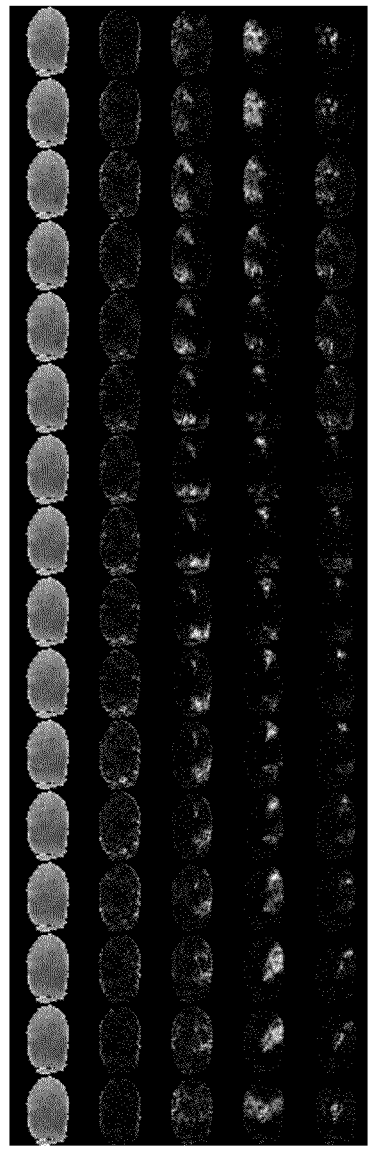
FIG. 28 illustrates the 80 coefficients utilized in the exemplary ridge flow detection according to this invention.

FIG. 28 is representation of the correlation between the fingerprint image and the target sinusoids (at various angles—vertical axis, and frequencies—horizontal axis). Each 'cell' in the array of images represents the response for the ridge flow calculation utilizing a sinusoid of specific frequency and presented at a specific angle.

The first column of data is the DC term—the average pixel value for the sampled window. For the remaining columns the brightness of the pixel is related to the strength of the coefficient, i.e., the brighter the pixel the stronger the correlation between the sub-window of the image and the target sinusoid. Following each column from top to bottom there exists a trend in the bright peaks as they move around the fingertip center in response to the general trend of fingerprint ridge flow.

Figure 29:
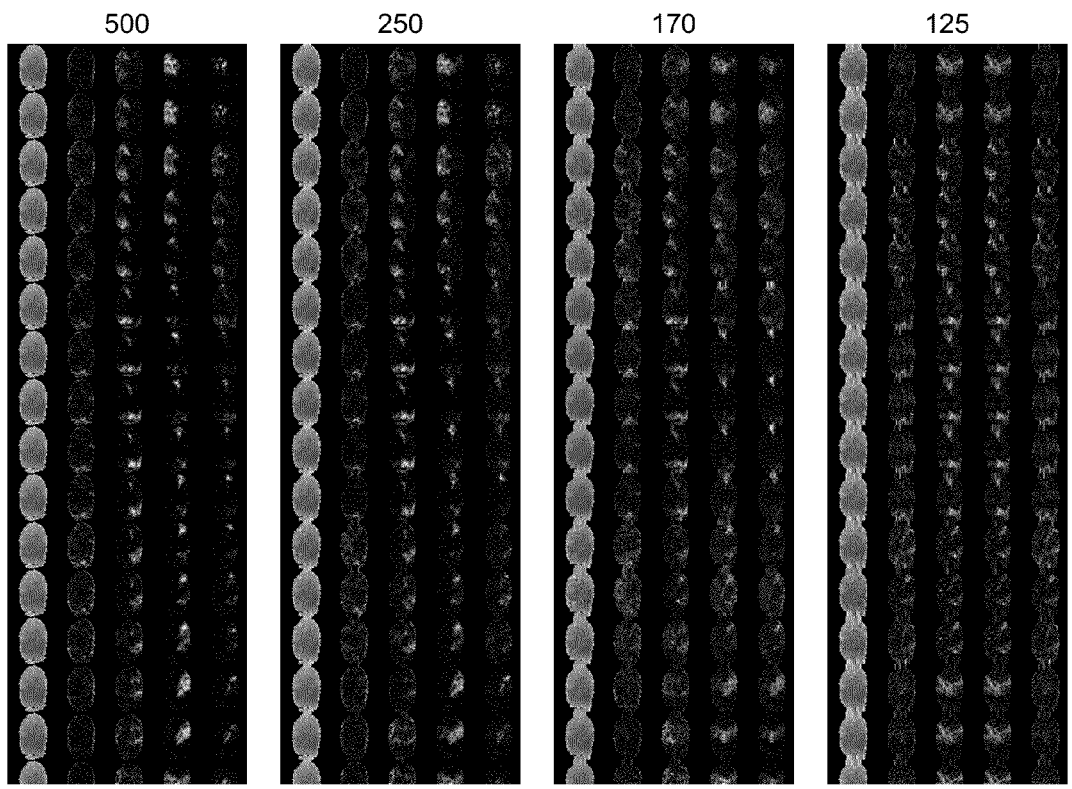
FIG. 29 illustrates the 80 coefficients utilized at four different resolutions in the exemplary ridge flow detection according to this invention.

FIG. 29 represents an extension of this image. Four separate examples of the same input image are presented at four different resolutions. The 500 ppi image represents the baseline expected result and trends (between the angles and frequencies). The results for the 250 ppi and 170 ppi approximately follow the trends within the 500 ppi image. The 125 ppi results follow the gross trends but there is degradation due to the failure of the resolution of 125 ppi to fully resolve the ridge flow in an average finger.

The described systems and methods can be implemented on an image processing device, fingerprint processing device, or the like, or on a separate programmed general purpose computer having image processing capabilities. Additionally, the systems and methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the flowcharts illustrated herein can be used to implement the image processing system according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The systems and methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general purpose computer, a special purpose computer, a microprocessor, or the like. The software can also be stored on a computer readable medium. In these instances, the systems and methods of this invention can be implemented as program embedded on personal computer such as JAVA® or CGI script, as a resource residing on a server or graphics workstation, as a routine embedded in a dedicated fingerprint processing system, as a plug-in, or the like. The system can also be implemented by physically incorporating the system and method into a software and/or hardware system, such as the hardware and software systems of an image processor.

It is, therefore, apparent that there has been provided, in accordance with the present invention, systems and methods for fingerprint quality and segmentation which may be particularly useful when used with fingerprint preview image(s). While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. An image quality determination method for an input image of any resolution comprising:
    determining ridge flow for a received image, wherein a grid spacing is determined based on a resolution of the input image;
    establishing a ridge flow map; and
    identifying one or more ridge flow detections; and
    determining a quality of the image at least based on the identified ridge flow detections.

2. The method of claim 1, further comprising determining and scoring the quality of the image.

3. The method of claim 1, further comprising assigning a bounding box to a portion of the image.

4. The method of claim 1, further comprising determining handedness of the image.

5. The method of claim 1, further comprising performing a historical analysis of a plurality of received images for one or more of quality, handedness and assignment of bounding boxes.

6. The method of claim 1, further comprising modifying a processing window and Fourier coefficient frequency based on the image resolution.

7. The method of claim 1, further comprising selecting grid points for the image and, for each image grid point, determine Fourier coefficients for a sub-window around the grid point for a predetermined number of frequencies at different angles.

8. The method of claim 7, further comprising determining a correlation map based on a peak correlation between the predetermined number of frequencies at different angles and a local ridge flow.

9. The method of claim 1, further comprising determining a peak ridge flow angle from a correlation map.

10. The method of claim 1, further comprising averaging a correlation map.

11. The method of claim 1, wherein the method is performed in real-time.

12. An image quality module for an input image of any resolution comprising:
   a ridge flow module adapted to determine ridge flow for a received image, wherein a grid spacing is determined based on a resolution of the input image, establish a ridge flow map, identify one or more ridge flow detections, and determine a quality of the image at least based on the identified ridge flow detections.

13. The system of claim 12, further comprising a quality determination module adapted to determine and score the quality of the image.

14. The system of claim 12, wherein the ridge flow module is further adapted to assign a bounding box to a portion of the image.

15. The system of claim 12, further comprising a handedness module adapted to determine handedness of the image.

16. The system of claim 12, further comprising an auto-capture module adapted to perform a historical analysis of a plurality of received images for one or more of quality, handedness and assignment of bounding boxes.

17. The system of claim 12, further adapted to modify a processing window and Fourier coefficient frequency based on the image resolution.

18. The system of claim 12, further adapted to select grid points for the image and, for each image grid point, determine Fourier coefficients for a sub-window around the grid point for a predetermined number of frequencies at different angles.

19. The system of claim 18, further adapted to determine a correlation map based on a peak correlation between the predetermined number of frequencies at different angles and a local ridge flow.

20. The system of claim 12, further adapted to determine a peak ridge flow angle from a correlation map.

21. The system of claim 12, further adapted to average a correlation map.

22. The system of claim 12, wherein the system operates in real-time.

23. The system of claim 12, further comprising a sampling module adapted to resample the input image.

* * * * *